(12) United States Patent
Catthoor et al.

(10) Patent No.: US 7,124,377 B2
(45) Date of Patent: Oct. 17, 2006

(54) DESIGN METHOD FOR ESSENTIALLY DIGITAL SYSTEMS AND COMPONENTS THEREOF AND ESSENTIALLY DIGITAL SYSTEMS MADE IN ACCORDANCE WITH THE METHOD

(75) Inventors: Francky Catthoor, Temse (BE); Antonis Papanikolaou, Athens (GR); Karen Maex, Herent (BE)

(73) Assignee: Interniversitair Microelektronica Centrum (IMEC), Leuven (BE)

( * ) Notice: Subject to any disclaimer, the term of this patent is extended or adjusted under 35 U.S.C. 154(b) by 341 days.

(21) Appl. No.: 10/817,310

(22) Filed: Apr. 2, 2004

(65) Prior Publication Data

US 2005/0039156 A1    Feb. 17, 2005

(30) Foreign Application Priority Data

Apr. 4, 2003   (EP) .................................. 03447082

(51) Int. Cl.
*G06F 17/50* (2006.01)
(52) U.S. Cl. .................... 716/2; 716/5; 716/10; 716/18
(58) Field of Classification Search .................... 716/2, 716/5, 10–11, 18
See application file for complete search history.

(56) References Cited

U.S. PATENT DOCUMENTS

| 5,870,313 A * | 2/1999 | Boyle et al. ................... 716/10 |
| 2005/0022141 A1* | 1/2005 | Walker et al. ................. 716/2 |
| 2005/0149898 A1* | 7/2005 | Hakewill et al. ............. 716/18 |
| 2005/0204316 A1* | 9/2005 | Nebel et al. ................... 716/2 |
| 2005/0251771 A1* | 11/2005 | Robles .......................... 716/5 |

OTHER PUBLICATIONS

B.Amrutur et al. "Speed and Power Scaling of SRAM's", IEEE Journal of Solid-state Circ., vol. 35 No. 2, pp. 175-185, Feb. 2000.
E.Brockmeyer et al. "Systematic Cycle budget versus System Power Trade-off: a New Perspective on System Exploration of Real-time Data-dominated Applications", Proc. IEEE Intnl. Symp. on Low Power Design, Rapallo, Italy, pp. 137-142, Aug. 2000.
J.A.Davis et al. "Interconnect limits on gigascale integration (GSI) in the 21st century", Proc. of the IEEE, No. 3, vol. 89, pp. 305-324, Mar. 2001.
R.Ho et al. "The future of wires", Proc. Of the IEEE, vol. 89, No. 4, pp. 490-504, Apr. 2001.

(Continued)

*Primary Examiner*—Paul Dinh
(74) *Attorney, Agent, or Firm*—Knobbe, Martens, Olson & Bear, LLP

(57) ABSTRACT

The present invention relates to the design of essentially digital systems and components. In one embodiment, a parameterized model of a sub-component of an essentially digital system is provided. This sub-component is used in components of the system, e.g. interconnect at the different levels (up to the packaging level) and includes all relevant parameters with their physical constraints. If certain parameters do not play a significant role at the system level exploration, they can be left out of the exploration. But then they should preferably be fixed on the value that allows the cheapest and most reliable process technology solutions (independent of their delay or energy consequences). For the parameters that do have a large impact, the subranges of their trade-off curves, especially Pareto curves, that are appropriate for a given target domain (e.g. ambient multimedia) should be carefully selected to match design cost, process cost and reliability issues.

29 Claims, 23 Drawing Sheets

OTHER PUBLICATIONS

K. Itoh et al., "Limitations and challenges of multi-gigabit DRAM chip design", IEEE J. of Solid-state Circ., vol. 32, No. 5, pp. 624-634, May 1997.

D. Sylvester et al., "Impact of small process geometries on microarchitectures in systems on a chip", Proc. of the IEEE, vol. 89, No. 4, pp. 467-489, Apr. 2001.

A. Vandecappelle et al., "Global Multimedia System Design Exploration using Accurate Memory Organization Feedback" Proc. 36th ACM/IEEE Design Automation Conf., New Orleans LA, pp. 327-332, Jun. 1999.

S.J.E. Wilton et al., "CACTI: An enhanced cache access and cycle time model", IEEE J. of Solid State Circuits, vol. 31, No. 5, pp. 677-688, May 1996.

S. Wuytack et al., "Minimizing the Required Memory Bandwidth in VLSI System Realizations", IEEE Trans. on VLSI Systems, vol. 7, No. 4, pp. 433-441, Dec. 1999.

R. J. Evans et al., *Energy Consumption Modeling and Optimization for SRAM's*, IEEE Journal of Solid-State Circuits, vol. 30, No. 4, pp. 571-579, May 1995.

T. Seki et al., *A 6-ns 1-Mb CMOS SRAM with Latched Sense Amplifier*, IEEE Journal of Solid-State Circuits, vol. 28, No. 4, pp. 478-483, Apr. 1993.

A. P. Chandrakasan et al., *"Low-Power CMOS Digital Design"*, IEEE Journal of Solid-State Circuits, No. 4, vol. 27, pp. 473, Apr. 1992.

J. Lachman et al., "A 500MHz 1.5MB cache with on-chip CPU", Proceedings of the ISSC Conference (1999) p. 192.

A. Chandrakasan et al., "A Low Power Chipset for Portable Multimedia Application", (1994) IEEE International Solid-State Circuits Conf., pp. 82-83.

A. Papanikolaou et al., "Interconnect Exploration for Future Wire Dominated Technologies" (2002).

http://research.compag.com/wrl/people/jouppi/Cacti.h, "Cacti", Accessed prior to Apr. 4, 2003 and retrieved after Apr. 2, 2004.

Rambus, "Gigahertz Rambus Signaling Technologies" (2001) pp. 1-4.

http://www.research.compaq.com/wrl/projects/memorySystems/m, "Memory System Project", (2000) pp. 1-3.

Sylvester et al., "Getting to the Bottom of Deep Submicron II: A Global Wiring Paradigm", (1999).

Doug Matzke, "Will Physical Scalability Sabotage Performance Gains?", (1997), pp. 37-39.

Arden et al., "International Technology Roadmap for Semiconductors" (2001).

Brockmeyer E et al: "Systematic cycle budget versus system power trade-off: a new perspective on system exploration of real-time data-dominated applications" Low Power Electronics and Design, 2000. ISLPED '00. Proceedings of the 2000 International Symposium on Jul. 26-27, 2000, Piscataway, NJ, USA,IEEE, Jul. 26, 2000, pp. 137-142, XP010517318 ISBN: 1-58113-190-9.

Givargis T et al: "System-level exploration for Pareto-optimal configurations in parameterized systems-on-a-chip" IEEE/ACM International Conference on Computer Aided Design. ICCAD 2001. IEEE/ACM Digest of Technical Papers (Cat. No. O1CH37281) IEEE Piscataway, NJ, USA, Nov. 8, 2001, pp. 25-30, XP002323201 ISBN: 0-7803-7247-6.

Grun P et al: "Memory system connectivity exploration" Proceedings 2002 Design, Automation and Test in Europe Conference and Exhibiton IEEE Comput. Soc Los Alamitos, CA, USA, Mar. 4, 2002, pp. 894-901, XP002323202 ISBN: 0-7695-1471-5.

Papanikolaou A et al: "Global Interconnect Trade-off For Technology Over Memory Modules To Application Level: Case Study" Int. Workshop Syst. Level Interconnect Predict.; International Workshop on System Level Interconnect Prediction 2003, 2003, pp. 125-132, XP002323252.

Papanikolaou A et al: "Interconnect Exploration for Future Wire Dominated Technologies" Int. Workshop Syst. Level Interconnect Predict.; International Workshop on System Level Interconnect Prediction 2002, 2002, pp. 105-106, XP002323203.

Yunsi Fei et al:"Functional partitioning for low power distributed systems of systems-on-a-chip" Design Automation Conference, 2002. Proceedings of ASP-DAC 2002. 7th Asia and South Pacific and the 15th International Conference on VLSI Design. Proceedings. Bangalore, India Jan. 7-11, 2002, Los Alamitos, CA, USA, IEEE Comput. Soc, US, Jan. 7, 2002, pp. 274-281, XP010588114 ISBN: 0-7695-1441-3.

\* cited by examiner

A) ORIGINAL MATRIX    B) DIVIDED WORDLINE

DESIGN METHOD FOR ESSENTIALLY DIGITAL SYSTEMS AND COMPONENTS THEREOF AND ESSENTIALLY DIGITAL SYSTEMS MADE IN ACCORDANCE WITH THE METHOD

BACKGROUND OF THE INVENTION

1. Field of the Invention

The present invention relates to the design of essentially digital systems and components thereof as well as to the essentially digital systems made in accordance with the design.

2. Description of the Related Technology

It is clear that in sub-100 nm technology nodes, the importance of interconnect on system delay and energy consumption will become dominant (see e.g. [5,6,9,12,8] and SPT research).

If this problem is viewed locally, from the process technology and circuit design point of view, this has been perceived for quite some time as one of the red brick walls for further progress in improved density, performance and reduced system energy. But when also the system and architecture view point are included several viable though usually not simple solutions exist to avoid that wall. This is especially true in the large market of embedded energy-sensitive systems as encountered in ambient multi-media, communication terminals and protocols, and consumer electronics in general.

What really counts in such systems is, namely, not the achievable maximal clock frequency but the overall system throughput. Moreover, usually this throughput is lower bounded but increasing it beyond that bound is not that useful. Hence, overall system timing is mostly a constraint (hard or soft) and the cost functions to optimize are system cost (in Dollars or Euro's) and system energy for a given functionality. In quality-aware (QoS) systems, the level of desired or achievable quality is another important system parameter. In order to achieve a better trade-off between all these different aspects for a given application, a complex exploration space has to be traversed. That has been proven to be nearly infeasible for the complexity of today's applications. Hence, the need for system design technology support, i.e. both systematic methodologies and appropriate supporting design tools wherever needed to keep the design time reasonable. Worldwide, many contributions have been made to some solutions in the last two decades. It has lead to several usable contributions for such system design technology and the research remains ongoing because despite the results achieved, many problems are still not sufficiently solved.

Up till 2001, all that research—at least in the digital domain—was performed using a (very) high-level abstraction of the underlying process technology. That abstraction, situated mostly at the parameterisable module level and partly at the standard cell level, was shown to be sufficient to arrive at good working designs already in the 80's. It has proven its worth up to today. But the advent of the wire dominated process technologies has—at least partly—broken down the validity of this abstraction. As long as transistors dominate, the predesigned circuits of the modules and standard cells could be combined without worrying too much about interconnections. Now that interconnect gradually becomes dominant, this leads to a system design problem. For the performance related aspects this is known as the timing closure problem. A similar problem exists for energy reduction because optimization at the system level has the largest impact but cannot rely on reasonably accurate energy models when the interconnect dominates.

This application domain (see above) has seen another clear trend in the past decade: most of the system energy, performance and other costs become dominated by the memories (on and off-chip) and the large communication routes. The logic islands in between become more and more negligible. One of the main reasons is that applications have become very data dominated accessing huge data sets. Another factor is the evolution of much of the memory from the board to the on-chip level.

As a result, the old system-level abstraction can be substituted by a new one, which is at least valid in the early system exploration phases: logic is mostly ignored and the memories and communication routes form the main cost factor to steer the exploration. For memories, parameterized modules can be used, even if the interconnect dominates. The internal models for these memories are heavily affected but it is still feasible to arrive at reasonable models. Several activities of ongoing research are relevant in this, such as the work of K. Itoh et al [7] and N. Jouppi et al [14], and in the group of M. Horowitz [I].

At present the number of technology related parameters in such models is quite small.

SUMMARY OF CERTAIN ASPECTS OF THE INVENTION

In one aspect of the present invention a coupling is provided between the process level interconnect models and memory models. Both energy and delay effects are included in these. As a result, experiments can show the direct impact of the effect of exploring different values of process technology parameters such as individual width and spacing, height (of the layer) and Vdd range. A similar procedure can be applied for the system-level communication network. Also for that purpose, parameterized modules can be constructed. In one embodiment, this relates to a direct cooperation between process technology development (in a very early phase), memory/communication circuit designers and system architects. The interconnect technologies typically include both the back-end layers and the package-level layers. In one embodiment, it couples parameterized modules to system exploration tools to explore process technology parameters on the global system costs (e.g. energy and area) for a given set of system performance constraints. Clear trade-offs are present for which all interesting points in the exploration space can be visualized in so-called Pareto curves. Such a framework allows design "what-if experiments" on the main process technology choices, and this for a given set of applications.

From a system design point of view, several fundamental measures can be taken to address problems introduced by worsening trade-off parameters, e.g. constraints and costs such as the increasing delay and power consumption in the chip interconnect. Power consumption on the wires, apart from capacitance, depends also linearly on the activity of the wires. By minimizing the utilization of the long wires, power that is consumed on them can be reduced. Wire delay is a problem that cannot be solved by system design directly, but mapping an application to a given platform architecture, (large) latencies can be tolerated on most of the signal communications while still meeting all system-level timing constraints, as long as the mapping methodology has appropriate ways of dealing with this. One way to do this is by introducing data parallelism and pipelining in the logic and allowing for larger communication delays to exist by pipelining locally and by increasing the latency and hence reducing the required clock frequency on large wires. A trade-off is involved with the buffer cost in that case, but by using a distributed memory hierarchy also that trade-off can be handled effectively to arrive at overall low power solutions meeting all real-time constraints. Some dependence bottlenecks can exist in the application too but experience has shown that these can be systematically broken or moved to places where they do not harm so much. So system designers can also work around the performance problems in the envisioned application domain.

Process technologists can provide some solutions for the energy consumption on the wires if the system designers can cope with the delay problems. Indeed, if making the long interconnects slower is an option then the physical dimensions of the wires inside the chip can be altered to provide a different trade-off, e.g. to provide a slower but more energy efficient interconnect, whenever wire density is less important. Furthermore, some dimensions of wires of the same interconnect type, e.g. local or intermediate that are the most active in a well-balanced design, can vary in different areas of the same chip. This is particularly so for spacing and width (as long as the minimal and maximum thresholds are met). Between layers, also the height can vary partly (between bounds). Another constraint is that every layer can support a maximum wire length. That is unlikely to play a very big role in a good design though because the trade-off approach especially the Pareto approach that will be explained below will move the selected operating point to higher layers as soon as the energy-delay curve motivates this. The result is that a range of wire dimensions can be allowed to exist. An important question that has to be answered is how system designers can effectively take advantage of this freedom already at the design stage. The Pareto approach becomes more effective if the distance between the extreme points of the range is large. There is no need to have lots of intermediate points, in practice a minimum of 3 to 5 points including the extreme points is sufficient, preferably the intermediate points are somewhat uniformly distributed between the extreme points.

A solution may be provided in three parts. In one embodiment, in the first part a parameterized model is built of a sub-component of an essentially digital system for a combination of a cost and a constraint, e.g. a parameterized interconnect model for power consumption and delay per unit length. Variations in width and height are allowed for within process enforced bounds. Also Vdd variations within a certain range have been incorporated. In one embodiment, trade-offs are considered and combinations of costs and constraint values selected, e.g. combinations of power consumption and delay per unit length, leading to trade-off curves such as Pareto curves. For example, at least back-end layers can be modeled but other layers can be included including packaging. Also additional geometrical parameters such as pitch/spacing can be included. Material related options can also be added and the trade-off, especially the Pareto curve concept can be used.

In one embodiment, in the second part, these trade-off curves, e.g. the interconnect Pareto curves have been integrated in a parameterized model of a component of the essentially digital system, for example in a model of a memory that reflects a cost/constraint combination, e.g. performance and energy consumption of an embedded SRAM for a 45 nm technology node. The basis can be the CACTI model [14] it is preferred if this is significantly extended to allow for parameterization and to scale its internal models to 45 nm. All modern low-power memories are based on banking. Also the banking parameter that was present in CACTI can be been maintained but the important interbank interconnect contribution is preferably added. Having a parameterized memory model and feeding the ranges in interconnect dimensions and supply voltages conclusions can be drawn about how the performance and the energy consumption of a single memory are affected by these ranges. For this purpose, also a steering methodology for the search space exploration is included in the developed software model. An example of trade-off curve, in this case a Pareto trade-off curve (now at the individual memory level), resulting from such an exploration, is shown in FIG. 2. The Pareto curves can be multi-dimensional, e.g. 3-dimensional or more-dimensional because also area and other design parameters can be included in the models and the exploration.

In one embodiment, the third part is the evaluation of the behavior of the entire component of the essentially digital system, e.g. the entire memory organization in a telecommunications application, e.g. of a specific DAB application. This parameterized memory model can be used to explore the effect on the complete memory organization mapping decisions for a DAB decoder. This leads to a very distributed, hierarchical memory architecture. Indeed, when only energy is considered it can be easily shown that total power consumption of the memories is minimum when there are many memories which are as small as possible. Thus, in one embodiment, the best strategy (at least for the L1 layer of a distributed shared memory, being the level directly above the register level) is to have each data variable in the application stored in its own memory. For practical reasons, such as testing though, usually that large number of memories is not feasible on chip. Moreover, the intermemory interconnect becomes an important contributor too, as experiments have shown. The result is that some arrays have to be stored together. The problems that arise are twofold. Both the sizes and required access frequencies of the memories increase. The increased bandwidth is not such a problem in itself, since the total number of memory accesses cannot change. But, combined with the increased sizes, it results in the same number of accesses happening to larger, more power hungry memories. The two main phenomena that can cause major problems are bit-waste and arrays with very different access frequencies being stored together. Both of these lead to an increased energy consumption again. So clearly complex trade-offs are involved. Suitable exploration tools are available, e.g. the SBO-MAA tool set [15, 13]) extended to couple them to the adapted memory models. The result of these tools is a memory access schedule and corresponding memory organization.

The real-time constraint for memory access times implied by this DAB implementation is 23.5 ns. That is quite well achievable by all the memories within the available Pareto curve range of the SRAM model. For this example process technology parameters at have been fixed and the banking parameter was explored. When the exploration is carried out in accordance with one embodiment of the invention, i.e. with the tools allowing the process technology parameters to vary, a global system energy gain of 30% is achieved. The system energy still depends on the number of RAMs that is allowed though (see FIG. 3). In this case the additional effect of adding Vdd scaling is negligible. But when more tight real-time constraints are added Vdd scaling also becomes important. Moreover, in more complete and complex designs where several threads of control are present and several processors are co-operating, more trade-offs will exist. In that case, the timing constraints typically lead to cases where the contributions of several variables and memories have to be added and only the sum has to meet the constraint. In that case, one of the contributions can be moved higher on the trade-off (e.g. Pareto) curve towards increasing energy but lower access delay in order to save more energy in the other module where the access delay can then be relaxed. In this last part of the experiments also the impact of inter-memory interconnect can be assessed, i.e. the buses that connect memories. The current conclusion is that for realistic voltage swings of about 0.1 V on these lines, the energy consumption on the buses is about 10% (or less) for a good floorplan (see FIG. 4). It is however clear from the experiments that a good system-level floorplan is required to keep that contribution low. So early floorplan predictions of the memory modules and their interconnect is important in wire-dominated technologies. Optionally, the logic parts can be ignored in that phase of the design.

Another complementary solution has been proposed in the past to partly deal with the interconnect delay bottlenecks. The idea is to use locally synchronous and globally asynchronous designs. These designs are based on islands of computations. All the computations are performed in various small regions of the chip and these regions are connected to each other through an on-chip network. As a result, within each island of computation everything is behaving synchronously, because the distances are small and signals can travel across them in one clock cycle. Communication between islands, which requires crossing of large distances on the chip, is then performed asynchronously. It is obvious that the problem of die reachability is minimized. Furthermore, energy consumption of the chip is also reduced. The reason is that the activity of the long wires is heavily reduced if the partitioning over the islands is done in a good way. Most of the signals only have to travel within each island, which means they travel short distances on local or at most intermediate levels of interconnect. These intra-island signals are anyway inevitable, if the design is already optimized. Making the communications more local means that we can reduce the chip energy consumption.

In summary, the skilled person will appreciate from the above that the present invention includes the following aspects:

1. A parameterized model of a sub-component of an essentially digital system, this sub-component being used in components of the system, e.g. interconnect at the different levels (up to the packaging level) and including all relevant parameters with their physical constraints. If certain parameters do not play a significant role at the system level exploration, they can be left out of the exploration. But then they should preferably be fixed on the value that allows the cheapest and most reliable process technology solutions (independent of their delay or energy consequences). For the parameters that do have a large impact, the subranges of their trade-off curves, especially Pareto curves, that are appropriate for a given target domain (e.g. ambient multimedia) should be carefully selected to match design cost, process cost and reliability issues.

2. A parameterized model of a component of the essentially digital system is constructed which includes the model of the sub-component, e.g. a memory model that incorporates the interconnect model. Here circuit related constraints can be added. Depending on the importance of inter-module interconnect also parameterized communication network models can be added.

3. System design exploration and tools therefore that incorporate the above models and explore trade-offs between the different costs (energy, size, quality-cost) within the constraints (usually timing related). Efficient mapping tools are preferably embedded in order to make the conclusions valid for realistic design contexts. A representative set of applications should be available within the target application domain. The source codes for these applications should have been optimized up-front in a platform-independent way. In one embodiment, only the platform mapping phases are repeated in the what-if explorations.

One embodiment of the present invention makes use of the fact that process technology is able to provide varying physical dimensions of sub-components of essentially digital systems, e.g. the interconnect lines. So, even the same type of interconnect, i.e. local, can have wires with different dimensions on different parts of the chip. This means that process technology can provide an energy-delay tradeoff to system designers and can be exploited.

On the other hand, circuit designers should be able to provide memories that work with a range of supply voltages. Alternatively, for instance when using deep submicron technology (below 100 nm), a range of different internal circuits e.g. sense amplifiers, can be of use. At least, they can provide different versions of the same memory with different supply voltages. Banking cannot provide a sufficient range in energy-delay optimal tradeoff points, but it should always be exploited since it drastically improves both memory energy consumption and delay.

Using this freedom, components such as memories can be built that have not one cost-constraint operating point, e.g. an energy-delay operation point, but a broad range of such points. The varying aspect ratio of the interconnect can give a good range in delay and a smaller one in energy consumption. Vdd scaling gives good ranges in both energy and delay (at least in 130 nm technology). Combining these degrees of freedom together with banking, one can have a large number of energy-delay optimal operation points for each memory. This allows us to fine-tune the memories in order to meet the timing constraints of the application with minimum slack, while consuming a minimal amount of energy.

On the application level, only by scaling the physical dimensions of the wires, significant gains can be achieved for power consumption. The experiments were made on an application that was already heavily optimized. As a result, one can conclude that these tradeoffs can further optimize the power consumption of a design significantly. So, memory energy consumption can be minimized by system designers by exploiting ranges in wire aspect ratio and supply voltage.

Inter-memory interconnect is another important aspect that cannot be solved by system designers alone. Activity on the system buses should be as low as possible and if possible it should take into account the length of the buses. But, layout and place and route decisions have a major impact on the power consumption of inter-memory interconnect. If this 'local' interconnect is very long then there is little system design can do to minimize their power consumption. Thus, this is a problem that requires collaboration and co-optimization between system design and placing and routing in physical design.

Another important conclusion is that if a good job is done in routing the inter-memory interconnect, then the power consumption is dominated by the energy consumed inside the memories. This intra-memory energy is dominated by the interconnect inside the memory, namely bitlines, wordlines and inter-bank interconnect To sum up, although inter-memory interconnect can be kept at low lengths and low power consumption, interconnect still dominates the overall power consumption of the memory organization.

Accordingly, one aspect the present invention provides an apparatus having a processing unit co-operating with a first and a second essentially digital hardware device (EDHD), each of the first and second EDHDs being at least partly made by semiconductor processing and the manufacture of the first EDHD having at least one different semiconductor processing step compared with the manufacture of the second EDHD, the apparatus being for execution of a first and a second behavior, further comprising means for selecting one of the first and second EDHDs for execution of both the first and second behavior, each of the first and second EDHDs executing each of the first and second behaviors at a plurality of operating points belonging to a trade-off set, each operating point relating to a constraint-cost combination, wherein any first combination within the trade-off set is characterized in that all combinations within the trade-off set having a cost function with a lower cost value than the first combination have a higher value of the constraint than the first combination and wherein all combinations within the trade-off set having a value of the constraint lower than that of the first combination have a higher value of the cost function than that of the first combination. In one embodiment, the means for selecting may be implemented in an operating system of the apparatus. An EDHD can be any of a memory, a microprocessor, a co-processor, an FPGA, a PLA, a PAL, a digital signal processing (DSP) circuit, a pipeline, a hardware accelerator, a driver circuit, a modem, an I/O interface circuit, or combinations thereof. In accordance with an aspect of the present invention the trade-off set is preferably Pareto optimized.

Embodiments of the present invention are defined in the attached claims. The present invention will now be described in more detail with reference to the following drawings.

DETAILED DESCRIPTION OF CERTAIN EMBODIMENTS OF THE INVENTION

In past and present technology nodes the power consumption of the chips was heavily dominated by the consumption in the transistors. Delay was also contributed mainly by the logic parts of the chip. But as feature size scales down, transistors become smaller and smaller. The result is that they become faster and less power consuming. Interconnections on the other hand cannot benefit from feature size scaling. In every technology node the pitch is decreased, making interconnect wires smaller and forcing them to be closer to each other. The smaller cross-sections of the wires that are necessary inevitably lead to a larger resistance of the line, while having very dense wiring on-chip increases the trans-capacitance of these wires. These effects create a number of problems, such as problems to cross long distances at the high clock frequency, cross-talk, increased power consumption and so on.

Figure 5:
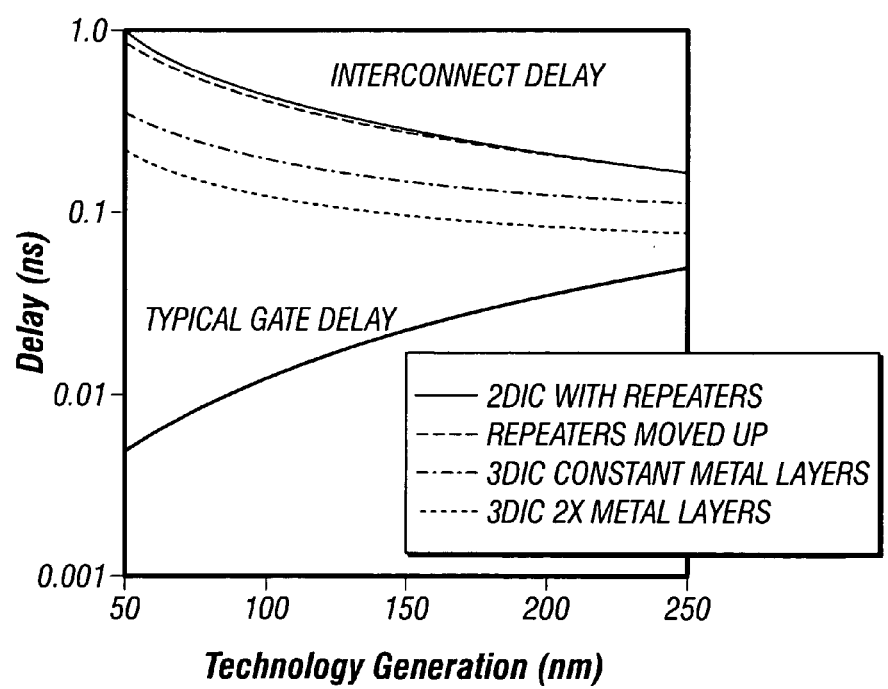
FIG. 5 illustrates a chart for explaining delay trend for interconnect and silicon [5].

From Davis et al. [5] it becomes clear that the trend is that interconnect delay will increase as technology scales down, see FIG. 5. Although many solutions have been proposed for this problem, as we can see in the curve they only manage to keep the interconnect delay from increasing too fast. Silicon delay on the other hand is decreasing rapidly. This means that at some point in time the wires will become as important and even dominate the delay of the design. Solutions like using repeaters, although they can help in increasing the clock frequency of the chip, cannot solve the fundamental problem and do not reduce the corresponding power consumption.

Matzke [9] describes the design problems that arise very well. In future technology nodes the part of the die that can be reached in one clock cycle will rapidly decrease. The reason is that wire performance cannot keep up with the increasing performance of transistors. As clock frequency increases rapidly and wire dimensions scale down, thus increasing RC delay, the length which a signal can travel in one clock cycle will be less than 10% of the die, in the near future.

Figure 6:
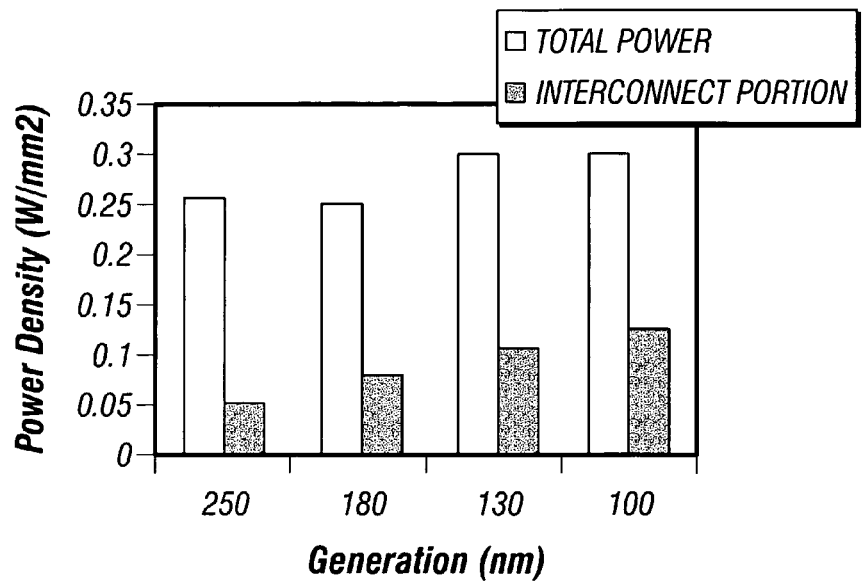
FIG. 6 illustrates a chart for explaining energy consumption trend for interconnect [12].

In [12], Sylvester et al. discuss the trend in energy consumption of interconnect, see FIG. 6. Total power density seems to slowly increase over the past and stabilize in the near future. The portion of it that is contributed by the interconnect, though, shows a steady increase through the technology nodes. In contrast, energy consumption for the same functionality when mapped to silicon decreases. The result is that energy consumption on the wires becomes ever more dominant as technology scales down. The actual energy consumption of the overall interconnect contribution is even worse because this figure only includes local interconnect inside a 50 kgate module. In [22], Sylvester et al. estimated that about 40% of the total power consumption of a chip can be consumed on the global interconnect distribution, wires and repeaters, in the 50 nm technology nodes under some assumptions. Today, in the 130 nm technology node, the power that is consumed on the global interconnect layer does not exceed a few percent.

It becomes very clear that the future performance and power consumption of chips will be heavily dominated by interconnect. From a process technology point of view a few things can be done, but the biggest effort is put on low-k dielectrics, which are not expected to be able to follow the ITRS roadmap's [8] aggressive predictions. From a system design point of view, on the other hand, several more fundamental measures can be taken to address these problems. Power consumption on the wires, apart from capacitance, depends also linearly on the activity of the wires. By minimizing the utilization of the long wires we can reduce power that is consumed on them. Wire delay is a problem that cannot be solved by system design directly, but while mapping an application to a given platform (large) latencies can be tolerated on most of the signal communications while still meeting all system-level timing constraints, as long as the mapping methodology has appropriate ways of dealing with this. So system designers can work around the performance problems too. One way to do this is by introducing data parallelism in the logic and allowing for larger communication delays to exist by pipelining locally and by increasing the latency and hence reducing the required clock frequency on large wires. A trade-off is involved with the buffer cost in that case, but by using a distributed memory hierarchy also that trade-off can be handled effectively to arrive at overall low power solutions meeting all real-time constraints. A trade-off differs from an optimization in that in a trade-off certain performance and/or design values become worse and some better. This results in various solutions with each solution having certain advantages and certain disadvantages.

One of the reasons these problems have arisen is that current process technology development (SIA roadmap) is mainly steered by the hi-end microprocessors' demands. The quest for maximum clock frequency has led to aggressive technology scaling, so that the delay of transistors can be minimized. Power consumption of transistors also benefits from technology scaling. But as it turns out, these gains are balanced by increasing power consumption and delay of the interconnections.

Acknowledging these problems, process technologists are willing to provide some solutions for the power consumption if the system designers can cope with the delay problems. If making the long interconnect slower is an option then the physical dimensions of the wires inside the chip can be altered in order to provide a slower but more energy efficient interconnect, whenever wire density is less important. Furthermore, dimensions of wires of the same interconnect type, i.e. local, can be different in different areas of the same chip. The result is that a range of wire dimensions can be allowed to exist. The question that has to be answered is how system designers can effectively take advantage of this freedom.

Another solution (complementary (and hence possibly used in combination) to the one to tolerate larger latencies on the long wires) that has been proposed in the past is to use locally synchronous and globally asynchronous designs. These designs are based on the idea of islands of computations. All the computations are done in various small regions of the chip and these regions are connected to each other through some kind of on-chip network. The benefit that arises is that within each island of computation everything can be done in a synchronous way, because the distances are small and signals can travel across them in one clock cycle. Communication between islands, which requires crossing of large distances on the chip, is done asynchronously. It is obvious that the problem of die reachability is minimized. Furthermore, energy consumption of the chip is also reduced. The reason is that the activity of the long wires is heavily reduced. Most of the signals only have to travel within each island, which means they travel short distances on local or intermediate interconnect. These intra-island signals are anyway inevitable, if the design is already optimized and making the communications more local means that we can reduce the chip energy consumption.

In one aspect of the present invention additional freedom in the design of sub-components, e.g. wire dimensions that can be offered by process technology towards lower power consumption can be exploited by system designers, in order to reflect that reduction in a better cost function, e.g. lower total system power. The principle is that given the additional freedom, the silicon and the interconnect can be tailored to exactly meet the application requirements with minimum power consumption.

1. Application Domain

In one aspect of the present invention the application domain is that of embedded multimedia and/or telecommunication systems. This context generally includes three large categories of applications: wireless/wired communications, network protocols and multimedia applications.

Network applications include communication/network protocols like IP in the "edge" network. In recent designs even the physical layer of the network becomes memory dominated, since it has to transfer data for multimedia applications that can be images or audio signals. Data for the operation and the administration of networks is also becoming very significant in volume. Examples are the turbo and Viterbi decoders, FFT in OFDM and SDMA matrix manipulations.

The other category includes multimedia applications such as MPEG-2, MPEG-21, QSDPCM, JPEG2000 and so on. Applications of this sort typically require very large amounts of memory because they have to store image frames or other large objects. The result is that designs that are made for these applications are memory dominated. Additionally, most of the operations that are executed in these kind of applications are transformations on data and similar DSP like operations. This implies a large amount of memory accesses in order to fetch and store all the data. Due to the very large memory space that is required for these applications the largest part of the chips of such designs are usually occupied by memories. As a result, even in today's technology node, most of the power of the chips that are designed is consumed in the memories.

Embodiments of the present invention will be focussed on memories and on minimizing their energy consumption, however it should be understood that these are only examples of the present invention. The skilled person will appreciate that the present invention has wide application to any sort of essentially digital device, in particular those which are wire dominated, being defined as those wherein internal wirings contribute sufficiently to the global delay and energy consumption.

As an example of a type of memories, on-chip embedded SRAMs have been selected. These are the memories that are currently used in designs and are expected to be used also in the near future. Embedded SDRAMs will also become important, but not for the 'local' memory layer. Activity on these memories can be kept low by Dynamic Memory Management and DTSE flows, but they will not be used as first layer memories. This fact emphasizes the need for on-chip memory hierarchy. In one aspect of the present invention, combinations of a constraint and a cost can be evaluated dependent upon changes in the processing technology used to make sub-components. As an example, the range in energy consumption and delay of interconnect that are provided by changing the physical dimensions of the wires is explored. By application of the present invention, the energy consumption of the system can be reduced significantly. Additional exploration ranges may be included, e.g. supply voltage. Current memories are designed to operate with a certain supply voltage. But in order to fine tune designs for power consumption memories that can operate with a range of supply voltages are preferred. Some memory libraries already provide this feature. Supply voltage scaling also provides a range in energy consumption and delay of memories. The rule of thumb is that such a change results in a trade-off—higher voltage means more energy consumption and less delay and vice versa. Two or three different designs of the same memory may be provided that operate with different supply voltages and delays.

One embodiment of the present invention has at least different parts. The first part relates to building a model of a component of an essentially digital system, e.g. a model of memory that will reflect the performance of an embedded SRAM at a 45 nm technology node. Having a memory model and feeding the ranges in interconnect dimensions and supply voltage conclusions can be made about how the performance and the energy consumption of a single memory are affected by these ranges. The second part is to evaluate the behavior of the component, e.g. a memory architecture of a specific design. As an example a model to simulate the memory architecture of a design for a DAB decoder is described with the effects of the given ranges on it. The last part is to assess the impact of the sub-component design, e.g. inter-memory interconnect, or the buses that connect memories to functional units, on the power consumption of the design.

The DAB decoder driver example has been already heavily optimized using the DTSE methodology. These optimizations are targeting low power operation and the main idea behind them is to minimize the number and the cost of memory accesses. Thus from a system design point of view, this driver has already been optimized as much as possible for a fixed process technology and memory bus library. Any further gains in power consumption come from the exploration of the ranges in interconnect dimensions and supply voltage are related to the application of the present invention. Another advantage of the DTSE optimizations is that they relax the real time constraints of the applications, mainly using software parallelism. The result is that it is possible to tradeoff relaxations on memory delay for lower power consumption.

2. Interconnect Options

In the 2001 ITRS roadmap [8] interconnect is classified into three different types, based on its length. Short interconnect of length smaller than 100 um is considered local, interconnect longer than that but shorter than 1 mm is intermediate and wires longer than 1 mm are classified as global interconnect. These length limits are soft, but are determined by the distance a signal can travel on each type of interconnect in one clock cycle. Thus the limits are there, not because of manufacturing restrictions, but because of timing constraints. Methods exist to overcome these problems, i.e. using repeaters. But these methods come with a significant overhead and design complexity. Capacitance and resistance are assigned to the different wires based on their length. Application of the present invention can meet design constraints with a lower cost and shorter design time.

An aspect of the present invention is to exploit the potential that is created for changing the physical dimensions of the wires between the different layers of the same interconnect type on the same chip. This can provide an opportunity for design time exploration in order to minimise global system-wide energy consumption.

Figure 7:
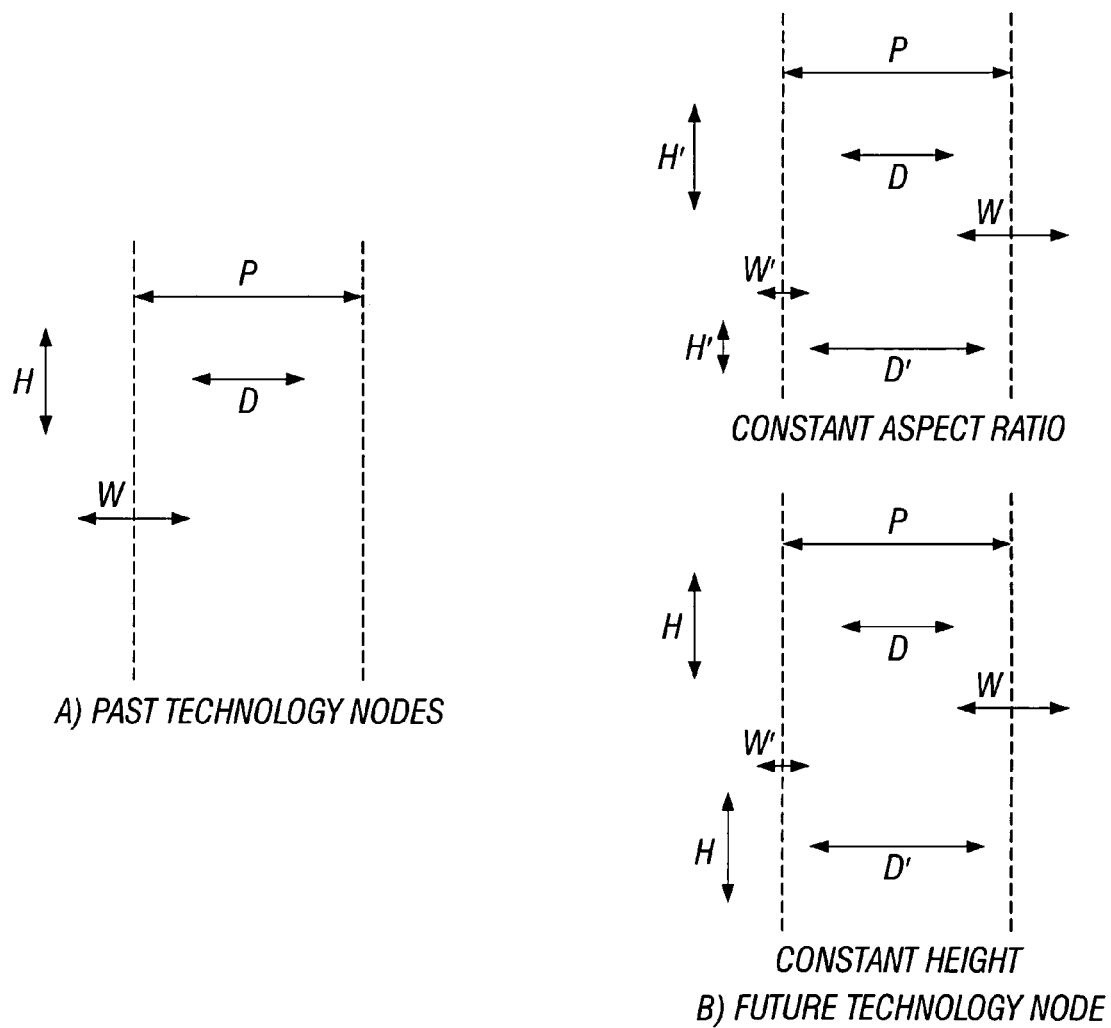
FIG. 7 illustrates charts for explaining potential scaling of interconnect dimensions.

In FIG. 7 the different options that will exist for interconnect are shown along with today's case. The left-hand side figure shows how interconnect is structured today. The wires of the same type on different layers have the same dimensions. P is the pitch and it is always constant for a certain type of interconnects. H is the height and W is the width of the wire. Finally, D is the distance between two adjacent wires of the same layer. All these parameters are very important for the calculation of energy consumption and delay on the wire. Energy, which is proportional to capacitance depends heavily on D, since capacitance is inversely proportional to D. A small distance between the wire means large capacitance and vice versa. On the other, delay hand depends on capacitance and resistance of the metal lines. Resistance depends on the area of the cross-section of the wires, which is the product of height times width.

These structural parameters can have a heavy impact on the delay and the energy consumption of the wires.

On the right hand of FIG. 7, the two different options for structuring interconnect in future nodes are shown. The flexibility that is added is that the physical dimensions of the lines between two layers of the same type can be different. For example, there can be fat intermediate interconnect on one metal layer and thin intermediate wires on the next. There are two feasible ways to change the dimensions of the lines. The first is to keep a constant aspect ratio, see FIG. 7 top. This way the ratio of height divided by width is kept constant, while both height and width of the lines vary. This can have a positive effect on capacitance, if the height and the width of the lines decrease, since all wires now have larger distances from each other. But, resistance is increased due to the smaller area of the cross-section of the wire. The opposite happens when the dimensions are increased. The other way to change the dimensions is to keep a constant height. Resistance increases, if width decreases (smaller cross-sections). Capacitance decreases, because wires of the same layer are further from each other, but capacitance across layers is a little more difficult to estimate.

Figure 1:
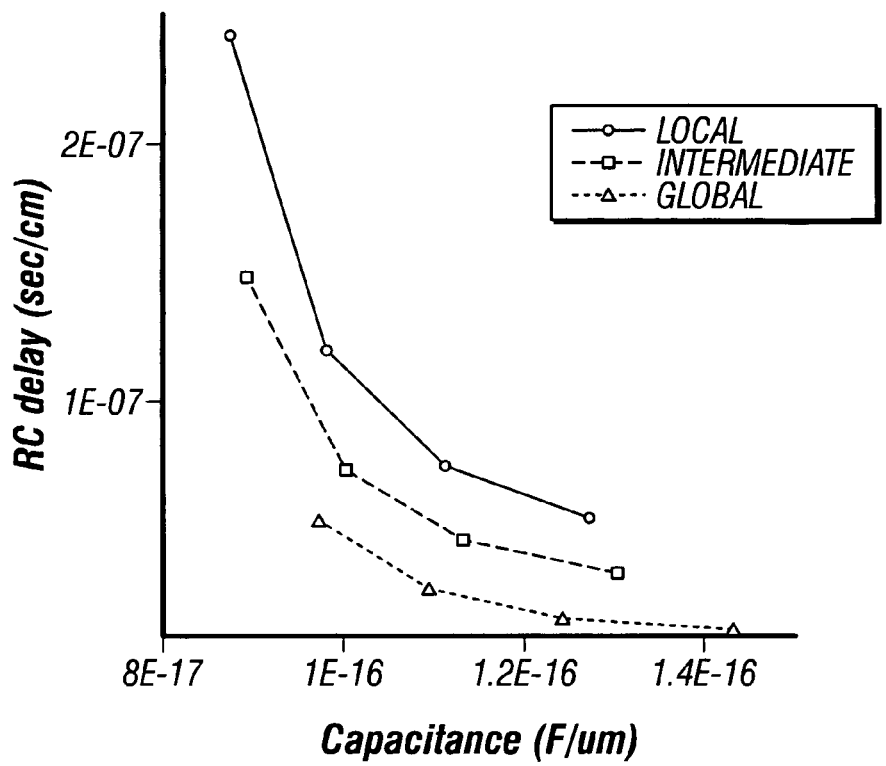
FIG. 1 illustrates a chart for explaining energy delay tradeoffs for different types of interconnect, when wire aspect ratio varies. V dd has been kept constant.

In principle, advantage can be taken of this potential and an interconnect can be built that exactly matches application demands. Furthermore, there is no limit to only one interconnect choice for a complete design. In accordance with an aspect of the present invention, different interconnect options for the different components of the design are explored and an optimal interconnect choice for each component that minimises a system-wide cost function can be selected. In one example, the attention is basically on a cost—energy consumption. By playing with the different technology aspects, e.g. dimensions, cost-constraint trade-offs, e.g. energy-delay trade-offs for the interconnect can be explored. These trade-offs are shown in FIG. 1, for the three types of interconnect. Note that the four points for each type have been created by keeping a constant height and changing the width of the wires, aspect ratio is width divided by height of the wire. The number of theoretically existing points is even larger, but these four are the ones that now seem feasible to implement. Current predictions are that aspect ratios between one and four are feasible. The higher the aspect ratio the more difficult it becomes to manufacture it. The reason is that the wire is very high and narrow and there is difficulty in filling this 'hole' with metal during manufacturing. It should also be mentioned here that the pitch can vary across the different types of interconnect. For example, the pitch on the upper layers of a chip, which consists of global interconnect, is larger than the pitch of local interconnect.

Figure 4:
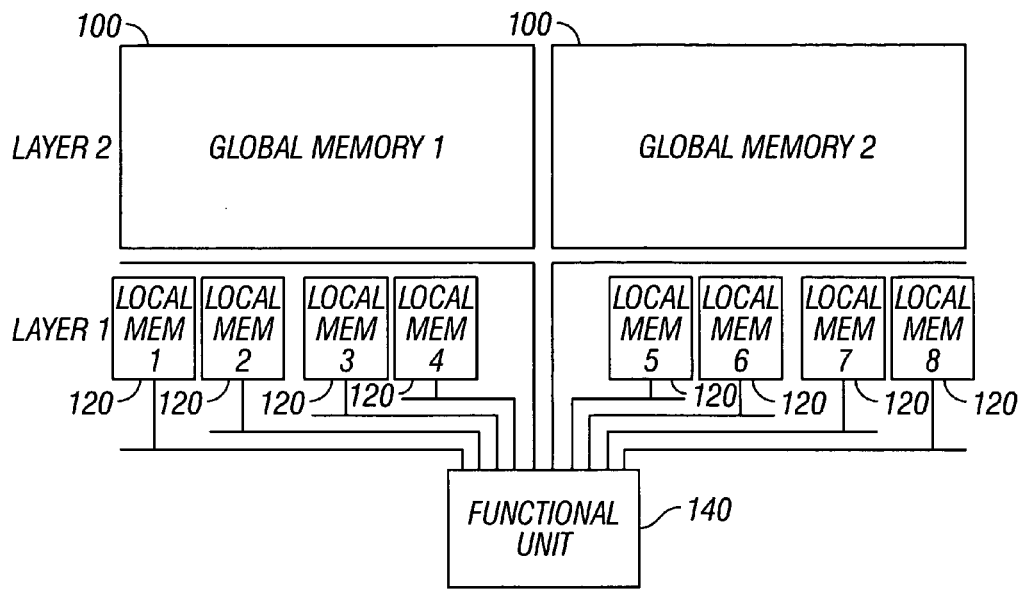
FIG. 4 illustrates an assumed floorplan for inter memory interconnect measurements.

From FIG. 4 it can be concluded that local interconnect has the highest delay and the smallest capacitance (and energy consumption) and global interconnect has the smallest delay and the largest capacitance. Intermediate interconnect lies in the middle. The reason for the variation in capacitance is that the lines of the global are much thicker, thus creating larger capacitances. But because of the thicker wires, the resistance of the global wires is much smaller leading to a lower value for RC delay.

This is better illustrated in the Table 1. This table was created for a constant configuration of the wires where the height is equal to half of the pitch and the width varies from half to 20% of the pitch. It is important to note that the pitch for the different types of interconnect is not the same. For local interconnect it is 0.105 micron, while for global ones it is 0.206 micron. For a certain type of interconnect, keeping a constant height and decreasing the width means that resistance increases, due to smaller cross-section, while capacitance decreases. It is interesting to note that delay, which is the product of resistance times capacitance, increases for smaller wire cross-sections. This happens because resistance increases in a much higher rate than the decrease in capacitance.

TABLE 1 various interconnect technology platforms
45 nm technology node

| Capacitance (F/um) | Resistance (Ohm/cm) | Wire width (micron) | RC delay (sec/cm) |
|---|---|---|---|
| Local interconnect | | | |
| 1.27e−16 | 4.43e4 | 5.25e−2 (0.5*P) | 5.65e−8 |
| 1.11e−16 | 6.93e4 | 4.2e−2 (0.4*P) | 7.68e−8 |
| 9.8e−17 | 1.23e5 | 3.15e−2 (0.3*P) | 1.21e−7 |
| 8.73e−17 | 2.77e5 | 2.1e−2 (0.2*P) | 2.42e−7 |
| Intermediate interconnect | | | |
| 1.3e−16 | 2.68e4 | 6.75e−2 (0.5*P) | 3.48e−8 |
| 1.13e−16 | 4.19e4 | 5.4e−2 (0.4*P) | 4.74e−8 |
| 1e−16 | 7.45e4 | 4.05e−2 (0.3*P) | 7.45e−8 |
| 8.91e−17 | 1.68e5 | 2.7e−2 (0.2*P) | 1.49e−7 |
| Global interconnect | | | |
| 1.43e−16 | 9.1e3 | 1.03e−1 (0.5*P) | 1.31e−8 |
| 1.24e−16 | 1.42e4 | 8.2e−2 (0.4*P) | 1.76e−8 |
| 1.09e−16 | 2.61e4 | 6.05e−2 (0.3*P) | 2.84e−8 |
| 9.7e−17 | 5.69e4 | 4.1e−2 (0.2*P) | 5.25e−8 |

3. Parameterized Memory Model 3.1 SRAM Description

The internal structure of an SRAM will be briefly reviewed. FIG. 5 shows the assumed organisation. The decoder first decodes the address and selects the appropriate row by driving one word-line in the data array. The array contains as many word-lines as rows in the memory matrix, but only one word-line in the matrix can go high at a time. Each memory cell along the selected row is associated with a pair of bit-lines; each bit-line is initially pre-charged high. When a word-line goes high, each memory cell determines which bit-line it should drive low. It is important to note here that in every access to this memory all the bit-lines, in a single plane or matrix, are activated. Currently there are no SRAM designs with one monolithic cell matrix, all designs have some kind of partitioning.

Each sense amplifier monitors a pair of bit-lines and detects when one changes. By detecting which line goes low, the sense amplifier can determine which logical value was stored in the memory cell. It is possible for one sense amplifier to be shared among several pairs of bit-lines. In this case, a multiplexer is inserted before the sense amplifiers; the select lines of the multiplexor are driven by the decoder. The number of bit-lines that share a sense amplifier depends on the layout parameters described later.

3.2 CACTI Model

The CACTI model (enhanced Cache Access and Cycle TIme model) [14] [21] is a cache simulator that was developed for the investigation and comparison of different cache organisations. It includes analytical models for every different cache component and calculates their delay and energy consumption by decomposing them to simple RC models. It claims very high accuracy compared to HSPICE simulations.

Figure 9:
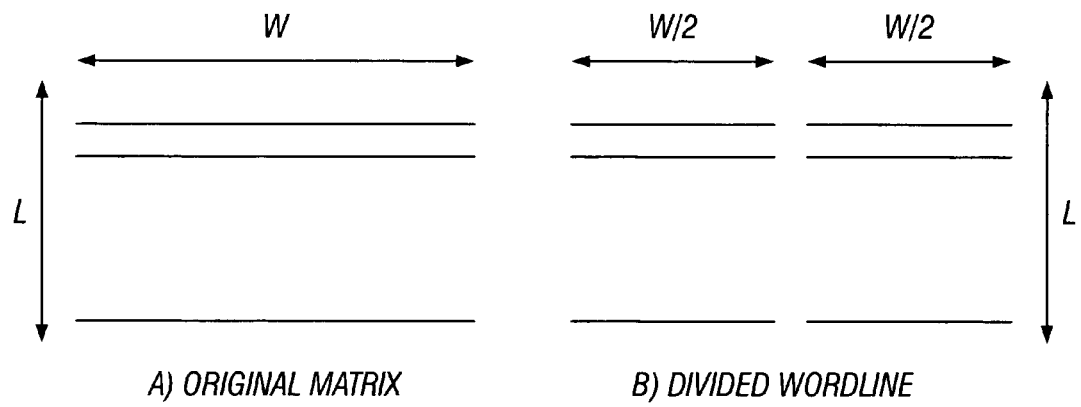
FIG. 9 illustrates a chart for explaining splitting the word line.
Figure 10:
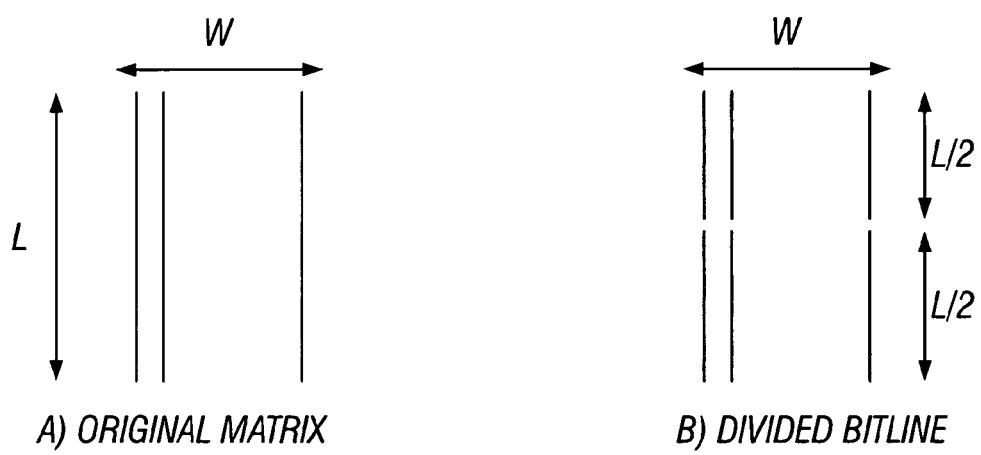
FIG. 10 illustrates a chart for explaining splitting the bit line.

The main feature that CACTI explores to minimise access delay is banking, which means splitting the memory matrix into several smaller matrices. To do this the model uses two parameters that are called Ndwl and Ndbl. In order to split the full memory one has three options. Either to split the word-line into several smaller word-lines, see FIG. 9, either to split the bit-line, see FIG. 10 or to split both word-lines and bit-lines. Ndwl is the number of split word-lines and Ndbl is the number of split bit-lines. The number of banks, or smaller matrices, is the product of Ndwl times Ndbl.

The reason that CACTI explores banking is that both delay and energy consumption are reduced. Having smaller matrices means that the length of the word-lines and the bit-lines will be shorter than that of the original lines. Since both energy consumption and delay of metal lines is proportional to the length of the line, shorter lines result in reducing both. Of course, banking introduces overhead such as periphery and inter-bank line effects, along with an area overhead. At some point, these effects should start cancelling any gains achieved by further banking. Unfortunately, this overhead is not modelled in CACTI.

Another parameter that is used by the CACTI model is Nspd. This parameter is the number of blocks that are mapped to a single cache line. It has a large impact on the delay and the energy consumption of the smaller matrices since it alters their 'shape', thus changing again the lengths of the bit-lines and the word-lines. Apart from that, also the architecture of the cache is affected, because block size is a major cache characteristic. One other effect that this parameter has, is making the matrices more square, if well chosen. Usually the word depth of a memory (and cache) is much larger than its bitwidth. By applying this parameter the model tries to make the matrices more square, than long and narrow, so that they are more feasible to implement and the length of the bit-lines is reduced.

In order to find the optimum cache architecture, CACTI uses a cost formula that takes into account delay and energy consumption. The formula is:

$$\text{Cost} = \frac{1}{2} \times \frac{\text{power}}{\text{maximum power}} + \frac{\text{delay}}{\text{maximum delay}}$$

The three parameters, Nspd, Ndwl and Ndbl, are fully explored and the one that minimises this cost function is the optimum banking architecture. Energy in the formula denotes the energy per access for the architecture being explored, the same apply for delay. Maximum energy and maximum delay denote the absolute maximum values of energy per access and access time for any combination of the parameters explored. Most of the times these maximum values come from the un-banked case. There is an upper bound for the parameters that are explored. So, Nspd, Ndwl and Ndbl cannot exceed 32 and the maximum number of banks in the memory also cannot exceed 32. These hard limits were probably set to avoid banking further, due to the lack of a banking overhead estimation.

This model can be scaled to different technology nodes. It was originally built for the 800 nm technology node and it offers the potential of scaling down to the 100 nm technology node. In order to estimate how the delay and the energy consumption of a cache will scale for different technology nodes, CACTI uses a complicated method. It assumes, very reasonably, that supply voltage will also scale across different nodes, so it uses the following formula to calculate the supply voltage at each node:

$$Vdd = \frac{4.5}{FF^{2/3}}$$

FF is a variable called fudge-factor and it is equal to 800 divided by the explored technology node in nm. So if we want to run the model for the 130 nm technology node, fudge-factor will be 6.15. The supply voltages that result for the different technology nodes are shown in Table 2.

TABLE 2

How Vdd scales in the CACTI model across different technology nodes.

| | Supply voltage scaling | | | |
|---|---|---|---|---|
| node | 350 nm | 180 nm | 130 nm | 100 nm |
| Vdd | 2.7 V | 1.7 V | 1.3 V | 1.1 V |

There also upper and lower bounds to the value that Vdd can be assigned. The maximum Vdd is 5V and the minimum is 1V. These numbers in Table 2 are consistent with the predictions of the 2001 ITRS roadmap for the 100 nm technology node, but are slightly higher than the roadmap's for the 130 nm node.

Apart from Vdd no other characteristics, such as transistor and wire capacitance and resistance are scaled, so the model is based on old values. To compensate for that, after all the computations the results, delay and energy, are further divided by the fudge-factor to give the final scaled results.

Although this is not an optimal way to scale down delay and energy consumption, at least this model provided a good starting point for modelling memories in future technology nodes.

3.3 Memory Model

In order to build a SRAM model for the technology nodes of 45 nm and beyond, the CACTI model is a start but is compensated for its shortcomings plus adding some more functionality to it. Apart from the exploration of banking schemes, the exploration of the effect of different interconnect aspect ratios and Vdd scaling on the memories is provided. To do this, the search space is extended, from the space of all the banking schemes, to the larger space that includes all possible combinations of banking, aspect ratios and Vdd choices.

For the interconnect the range of available options is presented above. For the Vdd the range of values is not clear. The prediction of the ITRS roadmap [8] is that supply voltage will be about 0.5 to 0.6 Volts. The actual exploration was for voltages that range from 0.5 to 1V, because this parameter is very important for system level exploration, especially in task scheduling. So, process technology decisions should keep a reasonable range even if this would come at a price elsewhere. Higher supply voltages than 0.6V will only be used in the case of very tight timing constraints, where a memory should drastically reduce its access time, with a penalty in energy consumption.

Figure 11:
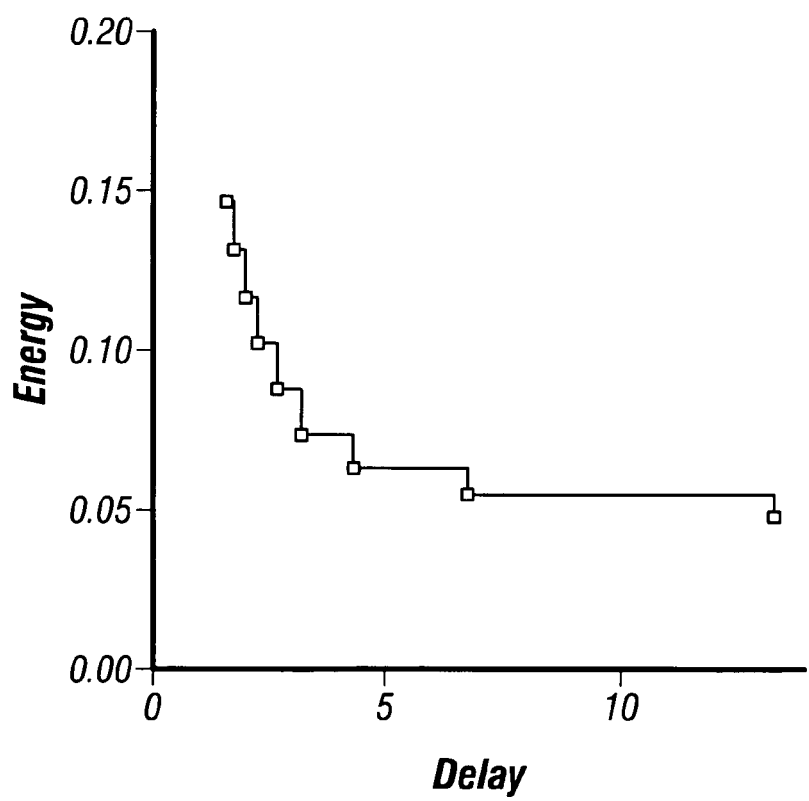
FIG. 11 illustrates a Pareto curve.

Another major modification to the functionality of the model was to change the output from the energy-delay pair that minimises a cost function for each memory, to the set of all energy-delay optimal results. A single lowest energy consuming or lowest delay operating point is not what is required but rather all the usable operating points. In accordance with an aspect of the present invention a number of operating points that are optimal is determined, so that later there is a freedom to decide which one suits the application better and thus to use that one. So instead of a single point in the energy-delay space, the output of the model is a trade-off cruve, e.g. a Pareto curve, like the one in FIG. 11.

A trade-off curve, of which a Pareto curve is one example, is the boundary between solutions whose feasibility is not very practical and solutions that are not optimal. Thus, the points of the Pareto curve are the optimal energy-delay solutions. There are no points that can have lower energy consumption and smaller delay than any of the Pareto points, otherwise they would be Pareto points themselves.

Another small modification to the model was to change the maximum values of Nspd, Ndwl and Ndbl to 64. This allowed the model to bank the memory more aggressively and take full advantage of the potential offered by banking. These bounds do not seem unrealistic since, even today, there are memories that have 16 banks. In future nodes, when silicon will be smaller in area and more efficient in delay and energy consumption, memories may be banked further, since the overhead of banking is an increase in logic circuits. However, the notion of banking overhead was introduced in the model.

Some more constraints are added so that the output of the model is realistic. For example, if a 4 kbit memory is divided into 64 banks, each bank will be 64 bits in size. This is not a realistic size for a bank, but without restrictions the tool will bank this heavily because delay and energy consumption is reduced, based on the modelling assumptions. To compensate for this, two constraints werte added on banking. First of all, a bank cannot be smaller in size than 1024 bits. This size is pretty small for current designs, but it does not seem unrealistic for the future. Current memory designs limit their bank size to a few kilobits to avoid problems with periphery overhead and testing. Apart from that, each bank introduces a constant energy consumption overhead to the memory. On top of the decoder and the MUXs, a constant energy consumption is added because of issues like periphery overhead. These two constraints should be able to control the model from going to banking schemes that are not realistic. Area overhead due to banking will be discussed later.

One thing that should be mentioned is the fact that the parameter Nspd remains in the model, even though caches are not veing considered. This parameter also played the role of a 'squaring factor'. This means that exploring Nspd enables finding the best combination of memory height and width that minimises memory delay and energy consumption. Actually, Nspd will directly affect the relative dimensions of banks inside the memory, so it is the optimal combination of Ndwl, Ndbl and Nspd that should be found.

3.3.1 Energy Consumption and Delay of Memory Components in the Cacti Model

Since the focus is SRAMs and not caches, the part of the CACTI model was kept that refers to the data side of the cache and ommited the part that refers to the tag side of the cache. This gave a good model of a SRAM.

Figure 8:
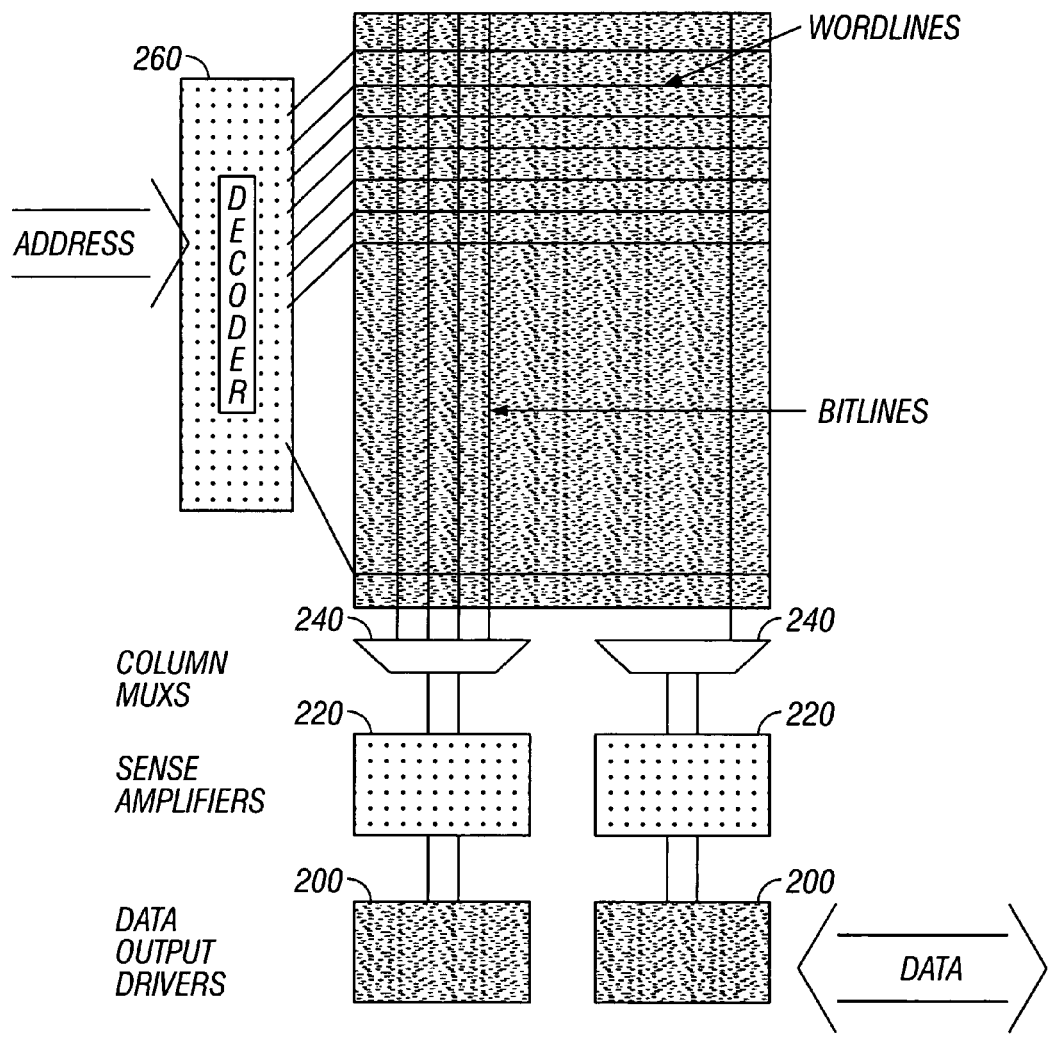
FIG. 8 illustrates an exemplary SRAM layout and different components.
Figure 12:
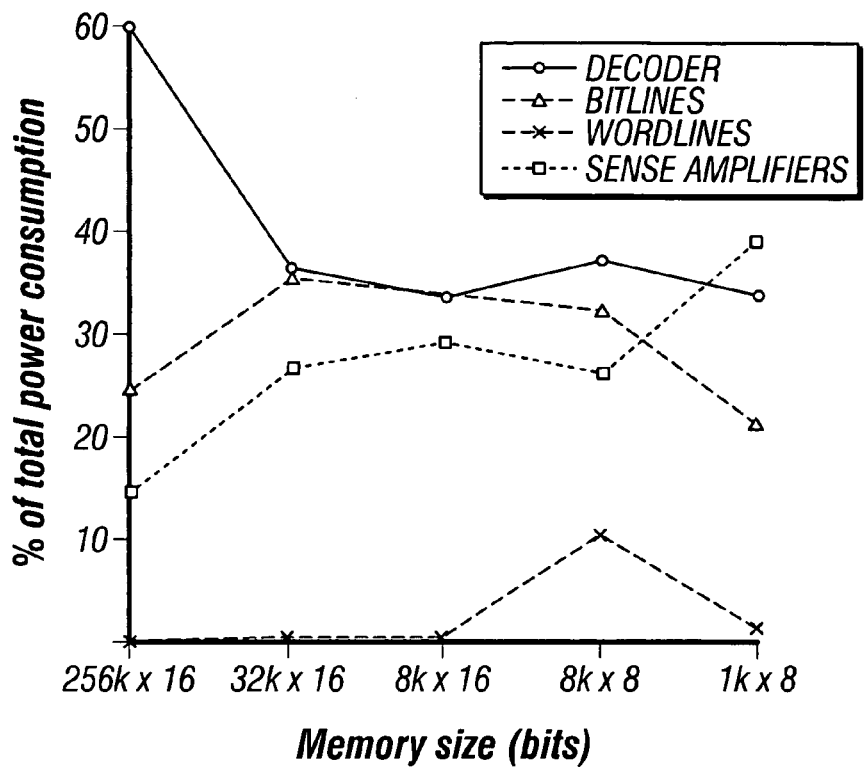
FIG. 12 illustrates a chart for explaining breakdown of memory energy consumption between memory components.

In FIG. 12 the energy consumption of the different memory components that is predicted by the CACTI model is shown as a percentage over the total memory consumption. The components that are shown here correspond to FIG. 8. The output driver 200 (FIG. 8), which is not shown in FIG. 12, has very small consumption, less than 1%. The 350 nm technology node was used for these experiments. The multiplexers 240 are assumed to be part of the sense amplifiers 220.

It is important to mention that as the number of rows in the memory decreases the contribution of the decoder 260 decreases. This is expected since the more rows a decoder decodes, the larger it will be. Although, one could expect that the energy consumption of the bit-lines would also be very big, this can be countered by banking. Still, it is clear that the bit-lines have a large contribution when the memory is very large. The conclusion that can be made is that for small and medium, up to 512Kbit, memory sizes the three components that contribute most of the power consumption seem to converge to somewhere around 30% each. The memory sizes in the applications of interest vary from very small memories, a few hundred bits, to about 512Kbit. From this point only memories of these sizes will be considered and not generalise to large SRAMs. From all the experiments that were done using this model the conclusion is that for these memories the energy contribution of the components that consume significantly is balanced.

Figure 13:
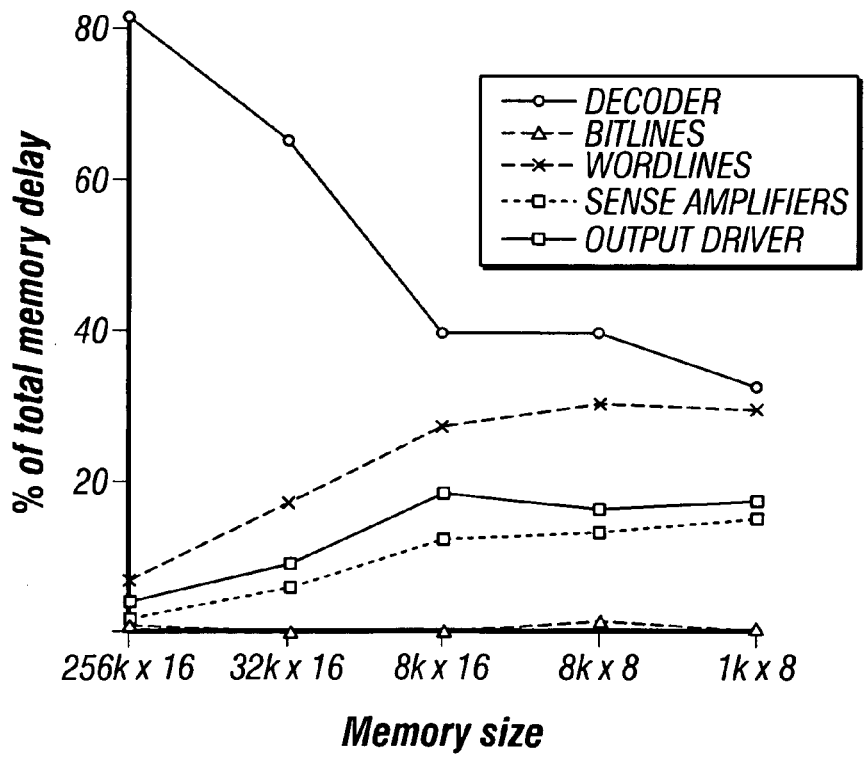
FIG. 13 illustrates a chart for explaining breakdown of memory delay between memory components.

For the delay, the breakdown is illustrated in FIG. 13. The conclusions are again that the delays of the different components, except from the bit-lines, seem to converge to some value around 20–35%. Small memories have a balanced contribution for energy and delay among the different components.

One thing that is interesting to note from these figures is that bit-lines and word-lines behave differently. Bit-lines have a large contribution in energy consumption and a negligible contribution in delay. On the other hand, word-lines contribute significant delay, but consume negligible energy. The reason is that all the bit-lines are activated during decoding, so the energy consumed is high, but there is almost no delay. For word-lines it is the opposite, only one word-line is activated, but it has to drive a large number of transistors, which leads to an increased delay and a small energy consumption.

3.3.2 CACTI Model Scaling

In order to evaluate the scaling behaviour of the CACTI model, a few experiments were made with the data-side of the model. CACTI was run a few times for a given memory size across different technology nodes. The memory chosen was a 128 kbit memory, organised as a 8 k words of 16 bits each.

Figure 14:
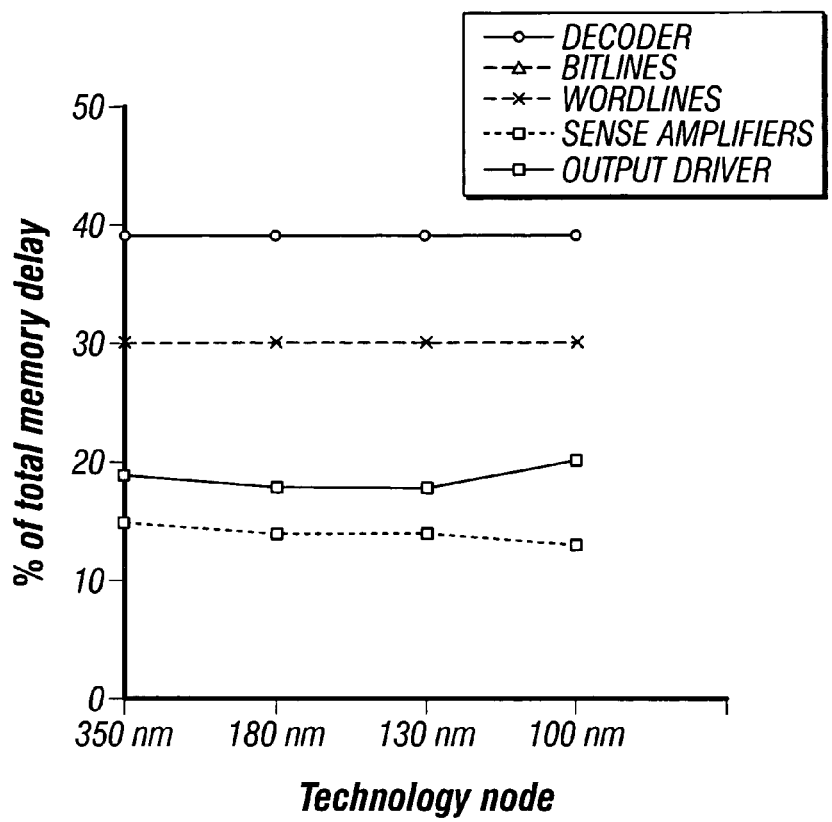
FIG. 14 illustrates a chart for explaining evolution of the delay contribution of the different memory components.
Figure 15:
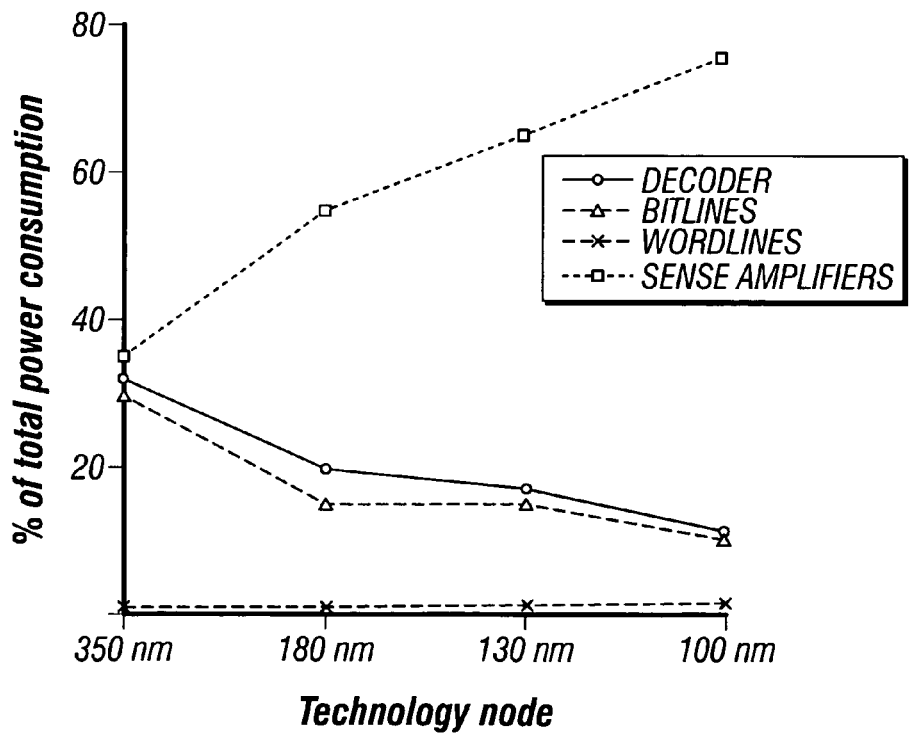
FIG. 15 illustrates a chart for explaining evolution of the power dissipation contribution of the different memory components.

In FIGS. 14 and 15 show how the delay and the energy consumption of the different components evolves through the different technology nodes. As far as the delay is concerned, the CACTI model predicts that the proportion of delay contributed by each component will not change significantly for the technology nodes down to 100 nm. This, however, is not true, because the trend, even nowadays, is that interconnect delay is becoming ever more significant, while the delay of silicon parts is becoming relatively smaller [8]. Thus, even for technology nodes larger than 100 nm the model fails to take into account the current trends. It is more realistic to assume that in the future the wires will increase their delay contribution. This is caused by the fact that scaling down transistors generally results in smaller transistor delay, but scaling wires increases the delay because of the increased resistance of the wire, as discussed previously.

For the energy consumption breakdown things are even worse. In the 350 nm node the contributions of the different components (that contribute significant energy) are quite balanced, which is expected. Word-lines and output drivers consume negligible energy and that is probably going to hold for future nodes too. But, scaling down from 350 nm to 100 nm, the energy consumption is heavily dominated by the sense amplifiers. Although sense amplifiers are analog circuits and it is difficult to predict how their energy consumption is going to evolve, it is probably safe to assume that designers will find a way to keep it reasonable. The problem is that the sense amplifiers are not actually modelled. Their energy consumption is assumed to be a constant, depending only on the bitwidth and Nspd. Up to now sense amplifiers contributed about 25–30% of the total power of the memory, so it is assumed that this is going to be true for future technology nodes too. The conclusion is that the way CACTI is modelling the sense amplifiers is not good for scaling down to 100 nm. Nevertheless, it can be seen that bitlines and the decoder still have balanced contributions over the total energy consumption.

3.3.3 Delay and Energy Contribution of Silicon Components in Altered Model

There are two major shortcomings to the scaling of the CACTI model. The first is the scaling of the energy and delay contribution of the silicon components, which appears not to take into account the relative importance interconnect will have at future technology nodes. The second is the fact that inter bank interconnect (internal memory buses that connect the different banks to the memory ports) are not simulated in the model, apart from a fragment of the address bus. Again, considering the delay and energy consumption that interconnect is expected to contribute, this is a major shortcoming which should be corrected.

In order to address these problems some further modifications were made to the model.

It is clear from FIGS. 14 and 15 that the results predicted by CACTI for future nodes are not very trustworthy. Taking into account the relative importance of interconnect delay and energy consumption for future nodes, it is assumed that the trend for future memories will be that energy and delay will be wire dominated. An exception might be the sense amplifiers, which are analog circuits, thus their performance is quite hard to predict. But, as far as the digital logic is concerned, it is going to become less and less important as technology scales down. Furthermore, the fact that small on-chip memories are being considered, means that decoders will not be dominant even in the 350 nm node. The main difficulty, though, is that no models of how transistor energy consumption and delay will scale are provided, despite having such models for interconnect.

It was decided to fix the contribution of the different silicon components to a certain percentage of the total memory delay and energy consumption. The first indication of what these percentages should be comes from CACTI itself, in the range of nodes that can be trusted. It looks like for energy consumption contributions from the sense amplifiers, decoder and bit-lines are pretty balanced, while output drivers and word-lines have negligible contributions. For delay, the main balanced contributions are between word-lines, output drivers, decoder and sense amplifiers.

In Seki et al. [18] things look pretty similar for the contributions of the silicon components. For energy consumption, decoder and sense amplifiers contribute about 30% each, while the output driver add about 1%. For delay, sense amplifiers contribute about 30%, while decoder and output drivers contribute about 20% each.

Evans et al. [17] provides another idea of contribution breakdown for energy. The contribution of the decoder, along with the data latches and the wordline drivers is about 60%. Another 30% is added by the bitlines and the output driver contributes again 1% of energy consumption. The surprise comes from the sense amplifiers which contribute negligible energy. Apart from the sense amps, the rest of the percentages are quite reasonable and agree with CACTI's, since the memory considered in the paper is a 4 Mbit memory for the 2 micron technology node.

In order to decide what the percentage contributions to be assigned will be, one also has to take into account the trend of interconnect delay and energy consumption. Due to the difficulty that sense amplifiers intrinsically have for design and prediction, it is assumed that their contribution will remain about the same as in the past, around 30% for energy and delay. On the other hand, decoders and output drivers are digital circuits that are expected to have reduced contributions for the 45 nm node. Therefore, it is assumed that the decoder will contribute 10% of delay and energy, while the output drivers will contribute about 10% of delay, but will remain very efficient in energy consumption contribution staying at about 1%.

One last part of the memory which should be discussed is the transistors that are connected to the bit-lines and the word-lines. In the past the capacitance of these transistors heavily dominated the capacitance of the metal lines. As a result, the energy consumption and the delay of bit-lines and word-lines was mostly due to the logic that is connected to the lines. In the future this situation seems likely to be reversed. Predictions show that for deep-submicron designs, capacitance of lines is going to dominate the capacitance of the logic. For the model a middle way was taken and it was assumed that for bit-lines and word-lines the capacitance of the metal lines will be equal to the capacitance of the logic connected to the lines.

3.3.4 Inter Bank Interconnect

The motivation for this step was the fact that, banked memories should have internal buses that are quite long. A memory that is not banked can have the port of the matrix directly connected to the memory port, without any additional wiring. Memories that are banked, however, need to have some internal bus lines that connect the memory address port to the bank decoders and the multiplexer output to the data port of the memory. These internal buses can be very long, much longer than the bit-lines and each bus consists of several wires. Furthermore, in each memory access the delays of these two buses are added, they cannot overlap. Therefore, they should be modelled, since they are expected to contribute a lot to overall energy consumption and delay.

To model these wires, the first thing which is needed is a floorplan of the memory. This floorplan should include inter-bank wires, but it should also include a model of the area overhead that banking introduces. The reason is that the length of the inter-bank lines is heavily influenced by the total memory area. The floorplan chosen in the model is shown in FIG. 16.

In this particular floorplan a banked memory is shown, where Ndbl is 4 and Ndwl is 2. So, the bit-lines of the memory are split in four smaller bit-lines and the word-lines are split into to smaller word-lines. Obviously, the number of banks is 8. This floorplan is used without loss of generality, since it can be extended to different banking schemes.

Figure 16:
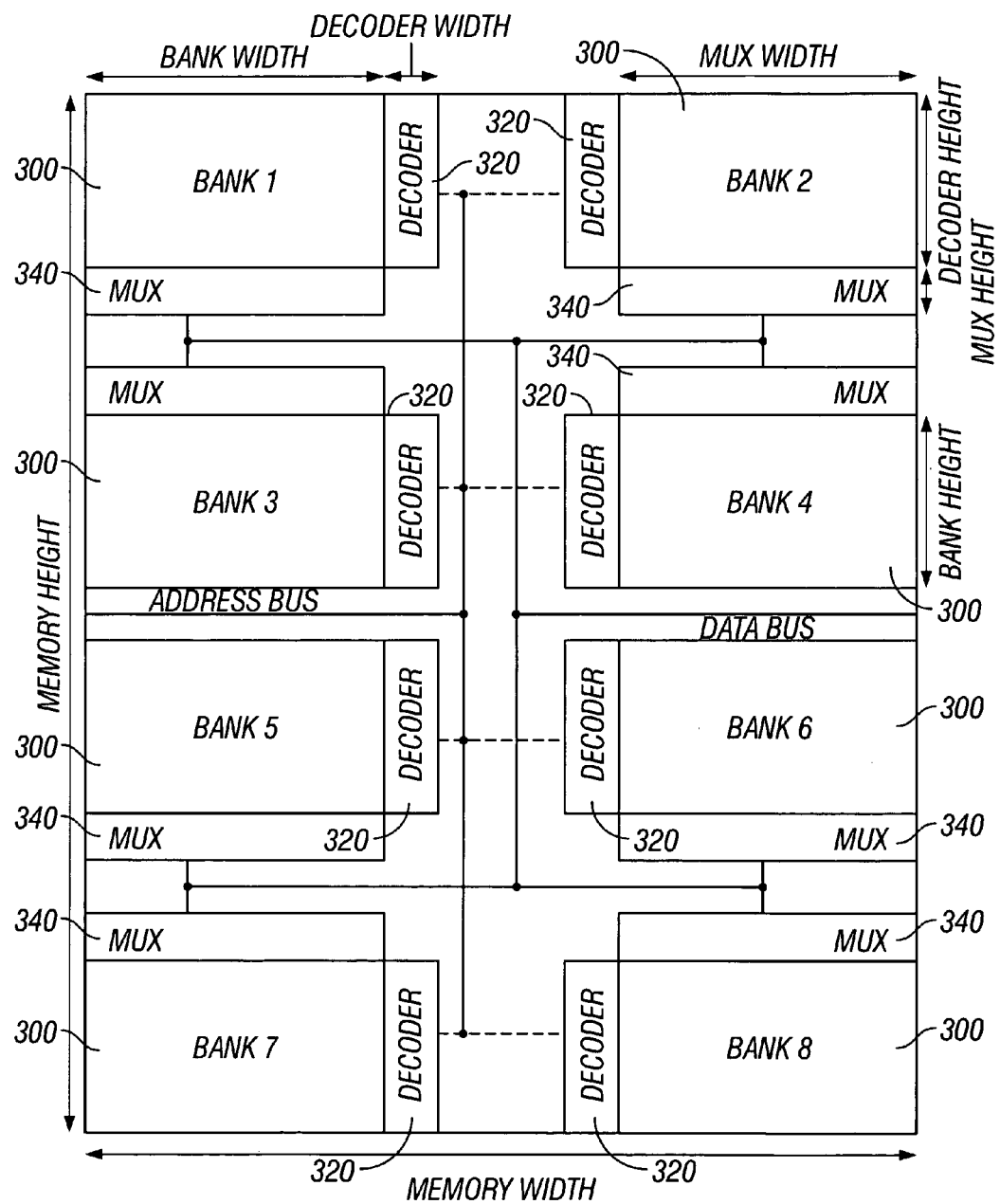
FIG. 16 illustrates an exemplary basic SRAM floorplan.
Figure 17:
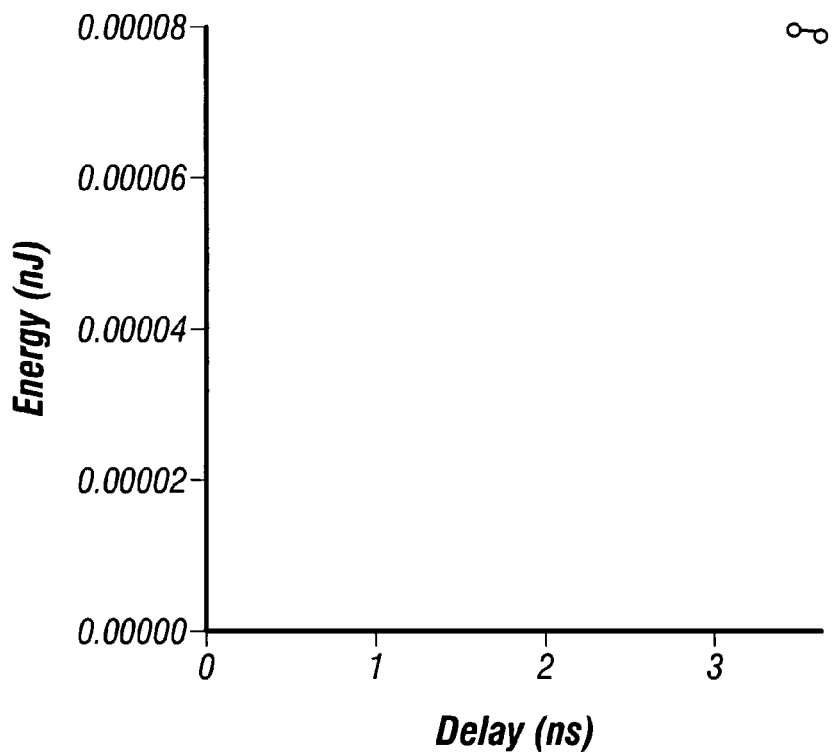
FIG. 17 illustrates a chart for explaining exploration of banking.

The basic assumption is that each bank 300 should have a decoder 320 and a multiplexer (MUX) 340 attached to it (FIG. 16). This assumption seems reasonable, since hierarchical decoding is used even nowadays. Thus, splitting a very large decoder into smaller ones and having some kind of layered hierarchical decoding seems like a reasonable design choice. As far as MUXs are concerned, attaching one to each bank seems the only choice, because the alternative is to have inter-bank buses with a lot more lines, which is not good for energy consumption.

Another assumption, is that switches on the address and the data inter-bank lines have a negligible contribution on delay and energy consumption.

The modelling of the area consumed by the MUXs and decoders was quite difficult. Having no good estimates of how much space these circuits will require at 45 nm, and their area was made proportional to the log 2 of the bank columns and the bank rows respectively and to some parametrisable constants. Another modelling difficulty is the decision whether sense amplifiers should be in every bank or only at the memory port. It is safe to assume that they can either be incorporated in the MUXs, for modelling purposes, or placed at the memory data port. In the first case, one should remember to reflect that in the modelling of the area of the MUXs and in the second case, the area of the sense amplifiers will not affect the length of the inter-bank lines, so no changes are needed in the model.

Before going further in dimension calculations, it should be noted that the area occupied by a bit cell is not square. The height of the cell is assumed to be 1 micron and the width 0.5 micron. These values have been extrapolated from past technology nodes and should hold for 45 nm, since scaling of transistor dimensions is linear. From all the above, the following formulas can be derived for the dimensions of the different memory components shown in the floorplan. S is the size of the memory in bits, B is the bitwidth and WP is the wire-pitch, the pitch of FIG. 7. All the dimensions are measured in micorn, unless stated otherwise.

The number of address lines (AL) is the width of the inter-bank bus connecting the memory address port to the bank decoders. For reasons of simplicity, it is assumed that this bus has a constant width throughout its length.

$$AL = \log 2(S)$$

The number of bank rows (BR) and bank columns (BC) are:

$$BR = S/(B*Nspd*Ndbl)$$

$$BC = (B*Nspd)/Ndwl$$

The height (BH) and the width (BW) of a bank are:

$$BH = BR*\text{cell height}$$

$$BW = BC*\text{cell width}$$

The decoder dimensions are assumed to be equal to $$DW = \log 2(BH)*C1 + C2$$

$$DH = BH$$

For the MUXs the formulas are similar:

$$MH = \log 2(BW/B)*C3 + C4$$

$$MW = BW$$

C1, C2, C3 and C4 are parameters that determine the eventual area of the decoders and the MUXs. It is assumed for the time being, that they are equal to 1.

Total memory height (MemH) and memory width (MemW) follow:

$$\text{Mem}H = Ndbl*(BH + MH) + (Ndbl - 1)*(B*WP)$$

$$\text{Mem}W = Ndwl*(BW + DW) + (B + AL)*WP$$

Finally the lengths of the inter-bank lines are the following:

address bus length: $ABL = 0.5*\text{Mem}W + \text{Mem}H$ data bus length: $DBL = 0.5*\text{Mem}H + \text{Mem}W$ For the calculation of these two lengths, the assumption was made that the switches that are on the address and data bus are 'smart' enough, to activate only the portion of the buses that is necessary. For example, if an address refers to the upper side of the memory, it is more efficient not to activate the address bus for the lower side of the memory. This means that these switches will act as small 1 bit decoders.

These formulas are derived directly from the floorplan. Some other routing of the inter-bank lines could eventually lead to a different length, but these formulas provide good estimates. Note that the floorplan and the dimension calculations are independent of the banking scheme that is provided in FIG. 16.

Obviously, if the memory is not banked, Ndwl=1 and Ndbl=1, then the length of these buses is zero.

3.3.5 Interconnect Assumptions for Internal Memory Lines

After determining the length of each metal line in the memory, some more information is used, to decide under which interconnect category each line is classified. The shortest lines inside the memory are the word-lines and the bit-lines. Although these lines can have lengths up to a few hundred of microns, for small and medium sized memories they seldom exceed 100 micron. Their length is very much dependent on the banking scheme that is chosen. As a result, bit-lines and word-lines have been classified into the local interconnect category.

The inter-bank line issue is different. Their length is usually in the range of intermediate interconnect and rarely is their length lower than 100 um or larger than 1 mm. These lines are, therefore, considered as intermediate interconnect.

3.3.6 Swing Voltages

Another important issue for energy consumption is the swing voltage on the different lines. Since energy is proportional to C*Vdd*Vswing a good estimate of the swing voltage should be determined, to give us a good approximation of real energy consumption.

In the CACTI model, for most of the components, the swing voltage is equal to the supply voltage. These components include the word-lines and all the logic components of the memory, such as the decoder and output drivers. The sense amplifiers have no swing voltage associated with them, since they are not fully modelled. The only component that has a lower swing voltage are the bit-lines, where it is 66% of the supply voltage. That holds only for the line and not the transistors connected to the line, which still have swing equal to the supply voltage.

A design that is more recent is that of Rambus [20], which includes an off-chip connection between the SDRAM and the processor on a PC motherboard. On this connection they have managed to keep the swing voltage to 200 mV, which a rather low value considering it is off-chip and the supply voltage is 3.3V.

In Lachman et al. [24] a 200 mV signal is used to communicate between the sense amplifiers and the I/O circuitry of a cache. The supply voltage for this design is 2V. This connection would fall into what are called inter-bank lines.

In Chandrakasan et al. [25] a frame-buffer SRAM is used on a low power chipset. The swing voltage on the bit-lines of the frame-buffer can be kept at 350 mV with a 1.1V supply voltage.

From [24] and Rambus, it can be concluded that a swing voltage of about 10% of the supply voltage is quite realistic. Rambus have gone even further, their swing voltage is 6% of the supply.

Since for the 45 nm node the supply voltage is predicted to be around 0.5V, it is safe to assume that swing voltages of 50 mV will be possible. Going lower than that will probably be impossible, since according to Davis et al. [5], 36 mV is the absolute minimum and below that changes cannot be detected.

Based on all of the above, it was decided to assign a swing voltage of 50 mV to the bit-lines and 0.1V to the inter-bank lines. The bit-lines can work with a lower swing voltage, because they are short and the signal will not have problems transmitting across the line. Especially if it is assumed that the sense amplifiers are placed on the output of each bank, this voltage is a reasonable choice.

The inter-bank lines, on the other hand, need a higher swing voltage because they have to 'carry' the signal for a larger distance.

3.3.7 Supply Voltage Versus RC Delay

The last issue that will be addressed, to complete the memory model, is how delay scales with Vdd. Some values of RC delay measured in seconds per cm of line are available, with no clear indication of how this delay changes for different values of supply voltages, because a range in supply voltage is not included in the predictions. For the 45 nm node, RC delay is calculated for a reference supply voltage of 0.5V, the roadmap prediction. It is clear that memory access time changes when Vdd changes, the larger the Vdd the smaller the access time. It is assumed that delay varies linearly with voltage. So, if the supply voltage is doubled, the delay will be half of the RC reference value. This, however, does not seem feasible for really low supply voltages.

4 Memory Exploration 4.1 Energy vs. Delay Pareto Explorations

This section shows the effects each of the parameters has on the energy per access and delay of a memory.

In FIG. 14 only banking is explored. This curve corresponds to a 64 kbit memory with a bitwidth of 8. This memory instance is used throughout these experiments. For this experiment, the supply voltage was assumed to be 0.5V and the fast and power hungry interconnect aspect ratio option has been adopted.

The result, as expected, is that banking does not provide many Pareto optimal energy delay points. The reason is that splitting the memory generally improves energy consumption and delay for bit-lines and word-lines. But, banking introduces an area overhead, which in turn should increase the length of the inter-bank lines, increasing their delay and energy consumption. Not having a good estimate of this overhead, small values have probably been chosen. The result is that although the inter-bank lines consume a significant amount of energy per access and contribute significant delay, the range in which it varies is not significant. Apparently the assumed area overhead is not large enough to give a large range in the length of these wires, which results in a very small range in energy consumption. This range does not seem enough to give Pareto points for different numbers of banks.

Another thing that should be noted is that both of these Pareto points occur for the maximum number of banks. The difference between them is Nspd, the 'squaring factor', which is 32 and 64, resulting in less memory delay and less memory energy consumption respectively. The reason behind this is that changing the Nspd parameter affects the memory area much less than the other two parameters. Thus, the relative length of the word-lines and the bit-lines changes, but the inter-bank lines are not significantly affected. The final conclusion, though, is that banking can do a lot for reducing memory delay and energy consumption, but it cannot provide a sufficient range of Pareto optimal energy-delay trade-off solutions.

Figure 18:
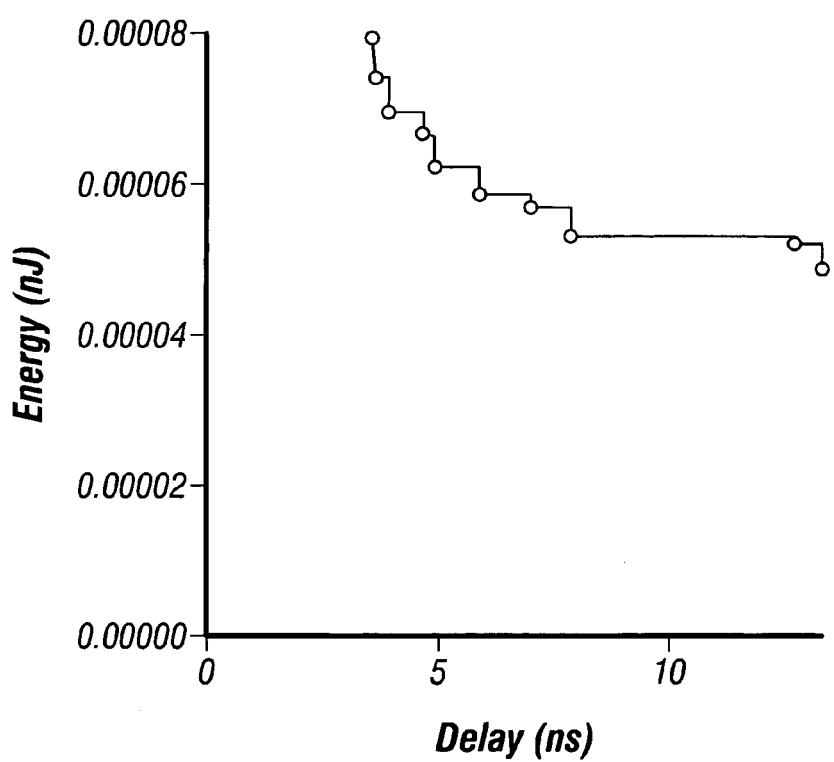
FIG. 18 illustrates a chart for explaining exploration of different interconnect aspect ratios.

In FIG. 18 the impact of exploring the different options for the interconnect aspect ratio is shown. To do this exploration all the different possibilities were taken into account. There are four options for the inter-bank lines and four options for the bit-lines and the word-lines, since they belong to different types of interconnect. The combination of these two orthogonal explorations is shown in FIG. 18. The supply voltage used is 0.5V, while the banking used is the most energy efficient.

It is clear that the range of values for capacitance and RC delay that is provided by the interconnect options is reflected in the energy-delay Pareto curve of the memory. For example, the Pareto curve has points that range roughly from 0.08 to 0.05 pJ in energy consumption and from 4 to 15 nsecs in delay. These values correspond to energy consumption and delay per access. From Table 2 it can be seen that the ranges in energy and delay for the interconnect were about 1.5 and 4 respectively. This means that changing the choice of interconnect parameters has a direct and almost linear impact on the performance of the memory. Another conclusion is that the different aspect ratio options mainly affect the memory delay, since they provide a large range in delay, a factor 4, and a smaller range in energy consumption, a factor 1.5 roughly. The result is that going to lowest possible energy consumption means paying a big price in delay.

From this exploration it can also be concluded that changing the interconnect parameters of the inter-bank lines has a larger impact than changing the parameters for the bit- and the word-lines. The points on the Pareto curve seem to be clustered according to their inter-bank lines parameters. The first (left) three points use the fastest parameters and the second three the immediately slower. The last two clusters have two points each. Inside each cluster of points the interconnect options for the bit-lines and word-lines vary. So a change in the inter-bank lines' parameters creates a bigger step (from the left point to the fourth from left) than a change in the intra-bank lines.

Figure 19:
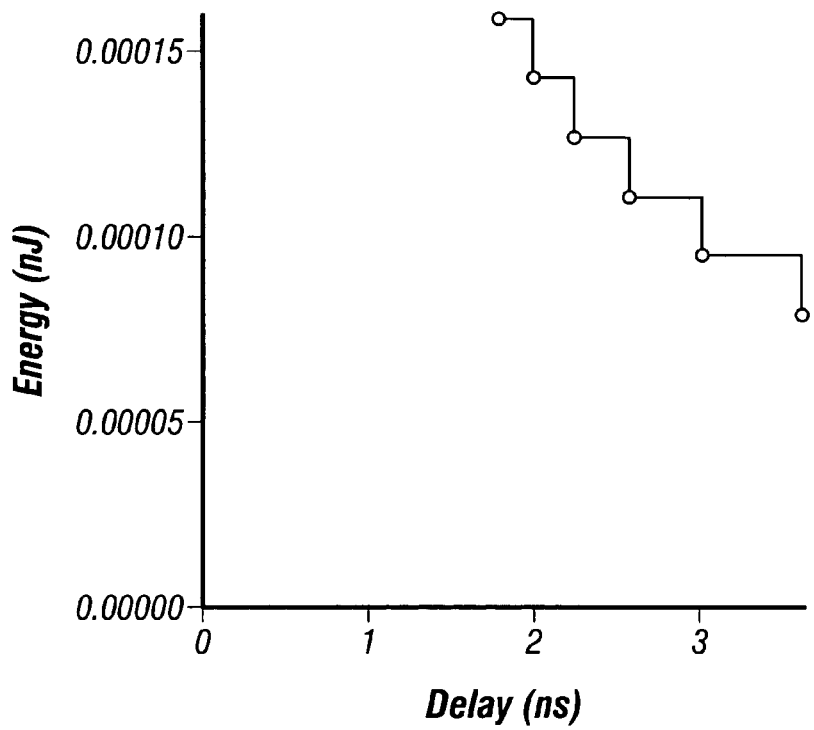
FIG. 19 illustrates a chart for explaining exploration of Vdd scaling.

The Pareto curve resulting from the range of supply voltages we have chosen is shown in FIG. 19. Because of the assumption of linear scaling of the interconnect delay with voltage this curve appears to be almost linear. The assumptions used are fast interconnect and energy optimal banking.

Scaling the supply voltage has a similar impact on energy consumption of the memory and delay. As described above, energy consumption is proportional to the supply voltage. But, delay is also proportional to the supply voltage since it is scaled from the reference voltage.

It can be concluded with the observation that in contrast to banking, both interconnect parameters and supply voltage scaling can provide a sufficient amount of Pareto optimal energy-delay solutions to support system-wide trade-offs.

Figure 20:
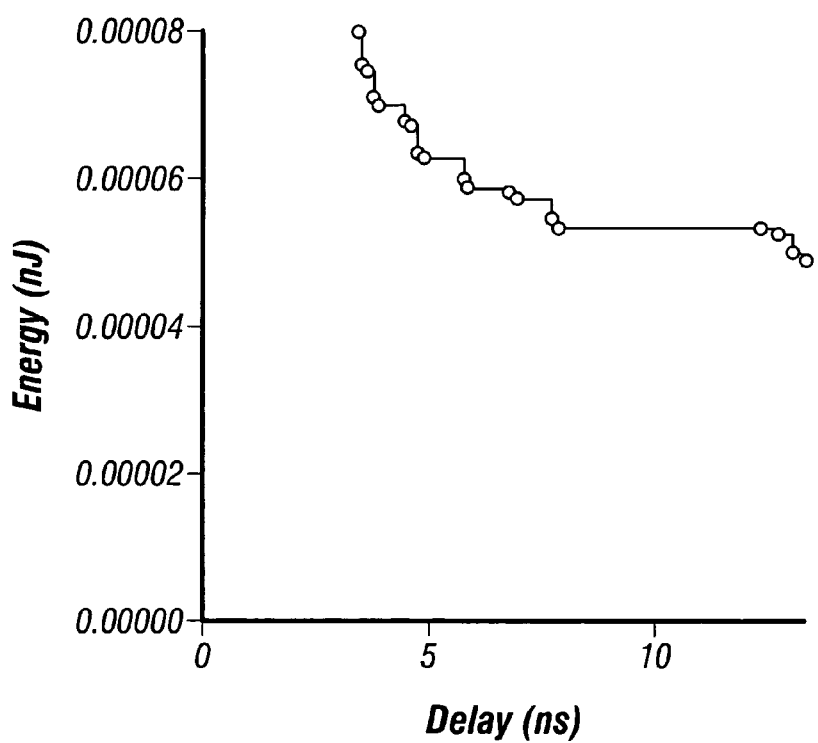
FIG. 20 illustrates a chart for explaining exploration of banking and wire aspect ratio options.

From this point on, the effects of combining the exploration of two or more parameters on the memory instance will be described. FIG. 20 shows the result of exploring the banking schemes along with the different aspect ratio options.

It is clear that this figure looks a lot like the one when exploring only the aspect ratio, see FIG. 18. The reason is that banking only produces two energy-delay optimal points which are very close to each other. Thus for every energy-delay optimal choice for interconnect both banking possibilities provide Pareto points. As can also be seen from previous figures, the wire aspect ratio has a much larger impact on the delay and the energy consumption of the memory, relative to banking.

Figure 21:
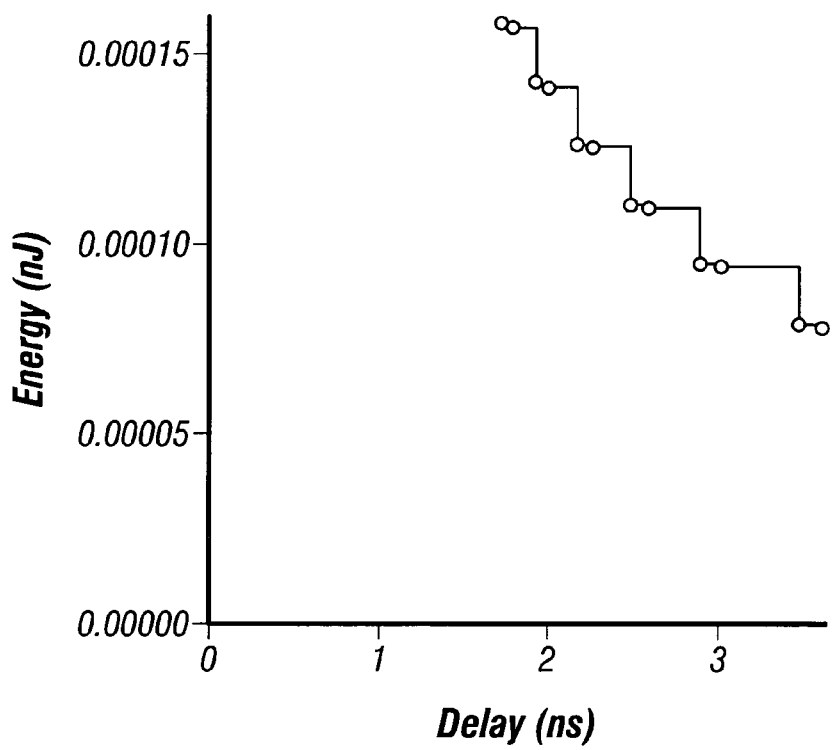
FIG. 21 illustrates a chart for explaining exploration of banking and Vdd scaling.

When the banking and the range of supply voltages is explored the result is shown in FIG. 21. The effect is again the same as in the previous figure.

Figure 2:
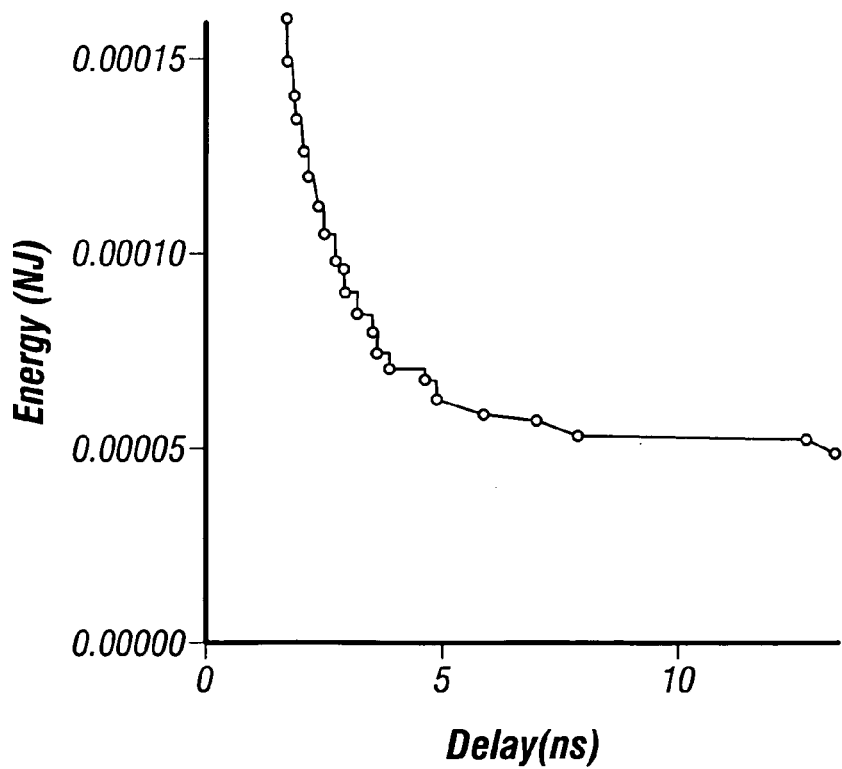
FIG. 2 illustrates a chart for explaining exploration of aspect ratio and Vdd scaling on energy-delay Pareto curve for specific SRAM of 8 k words of 8 bit.
Figure 3:
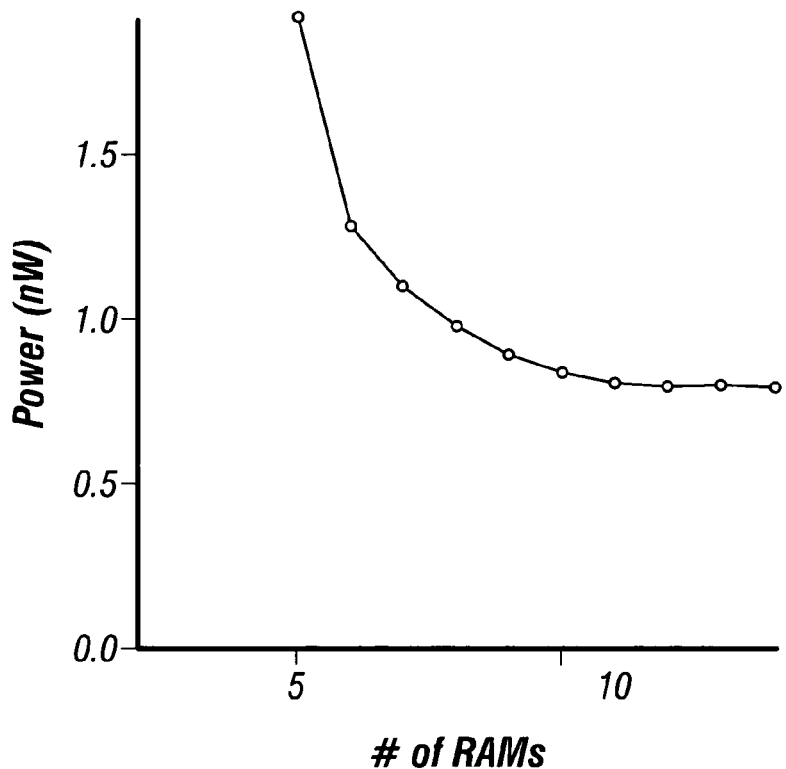
FIG. 3 illustrates a chart for explaining real-time constraint of 23.5 ns for DAB: reference with only banking explored (left) versus interconnect aspect ratio options and banking explored (right).
Figure 3:
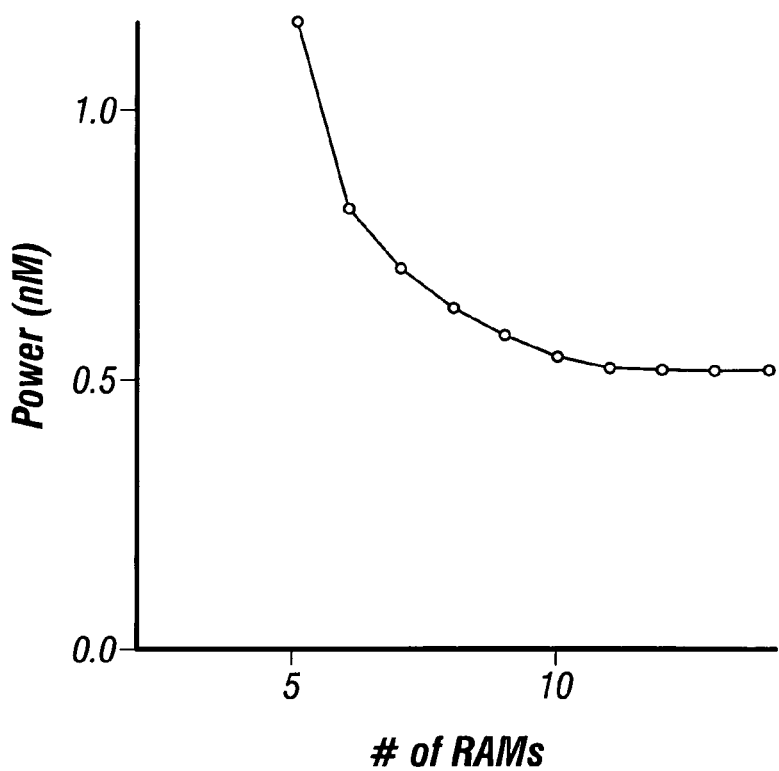

Choosing different supply voltages for the memory results in different energy-delay tradeoffs, which cover a wide range. Banking only introduces two points for each voltage that are very close. If the banking scheme is fixed to the most energy efficient and when the explored degrees of freedom are the interconnect aspect ratio and the scaling of the supply voltage the result is as in FIG. 2. This Pareto curve is very interesting, since it contains a large number of points and includes a sufficient range in delay and energy consumption for global system-wide tradeoffs.

The two points on the right are useful only in the case of very relaxed timing constraints, where the delay sacrificed for such a small gain in energy is acceptable. In the rest of the cases, the other points provide plenty of energy-delay solutions for a designer to use in order to globally optimize the performance of the memory architecture. In this curve half of the points use a supply voltage of 0.5V and the other half resort to larger voltages to further reduce their delay. The minimum delay which can be achieved with 0.5V is 3.6 nsecs. If that delay does not satisfy the global system timing constraint then the supply voltage should be increased, thus increasing the energy consumption more rapidly.

Figure 22:
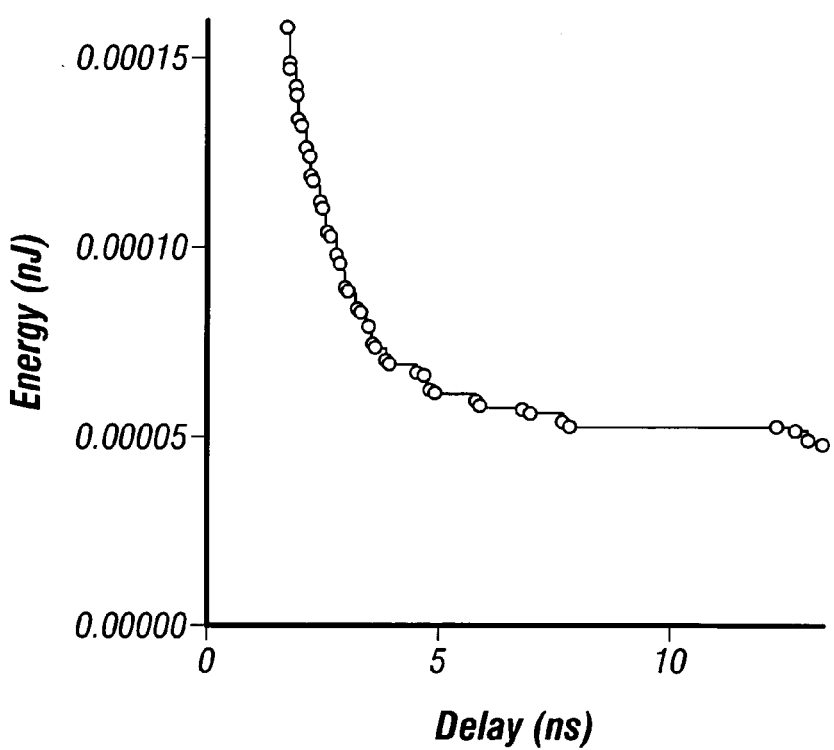
FIG. 22 illustrates a chart for explaining exploration of banking, interconnect and Vdd scaling.

The final energy-delay experiment was that of exploring all the available possibilities. The resulting curve, FIG. 22 is very similar to the previous one. The only difference is the addition of the points that have the smaller 'squaring factor'.

The final conclusion that can be drawn from all these experiments is that there is a preferred order in which the different parameters should be explored for optimal results. Banking has a relatively small impact on the energy-delay curves, thus in the current model, it is probably not worth the effort to include it in these explorations. Memories should be optimally banked individually, since there is not enough potential for global optimizations or tradeoffs. On the other hand, aspect ratio options and Vdd scaling can give a significant trade-off range in both energy and delay. For the power conscious applications we are considering, it is better to avoid raising the supply voltage as much as possible. Exploring interconnect aspect ratio should be the first step for system wide tradeoffs, while Vdd scaling should be the last resort, since the overhead in energy consumption is significant. This indicates again the importance of giving access to (and including) technology parameters like the interconnect aspect ratio.

4.2 Alternative Pareto Explorations

To get an idea of the impact these explorations have on the area of the memories, some alternative explorations have been performed. The same memory instance has been used, 8 k words of 1 byte, to make Pareto curves that also take area into account. These explorations include all possible parameters, banking, interconnect aspect ratio and supply voltage.

Figure 23:
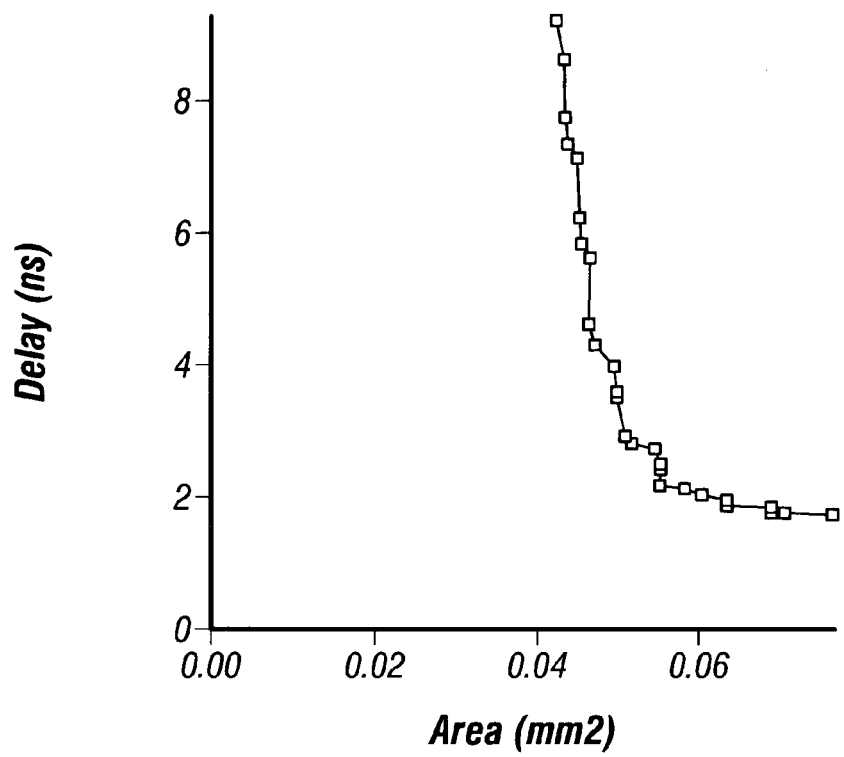
FIG. 23 illustrates a chart for explaining area-delay Pareto curve.

In FIG. 23 an area-delay Pareto curve is shown. In these experiments no limit is placed on the energy consumption. As a result, the points that have less than maximum area are not banked to the limit, thus they are not energy efficient.

This curve, though, is interesting because it can be seen that an impact exists in these explorations on the area that the memory occupies. The range in area comes from the different degrees of banking. A non-banked memory will occupy minimum area, while a heavily banked will occupy maximum area. If area is an important aspect of the design, then these kind of curves should also be taken into account, apart from the energy-delay Pareto curves.

Figure 24:
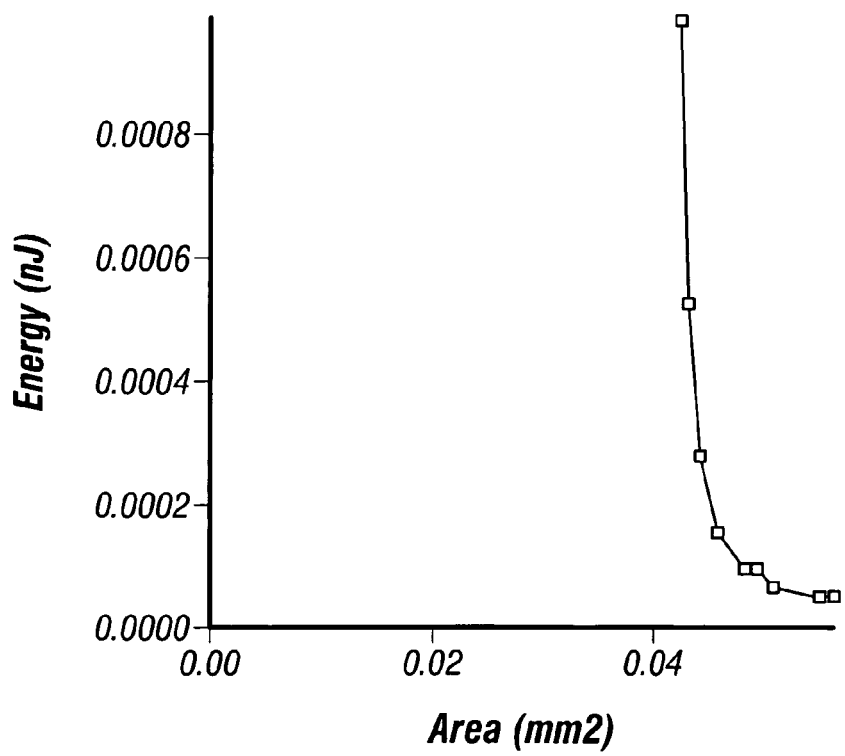
FIG. 24 illustrates a chart for explaining energy-area Pareto curve.

FIG. 24 shows the energy-area Pareto curve of the same memory. There is no limit on the memory delay. The conclusion that can be drawn from this curve is the same as the one made earlier. Exploring banking schemes is not useful if area is not really critical in the design. The gains in energy consumption from banking to the limit are obvious (more than a factor 10), while the overhead of area is not that important (about 50%).

Figure 25:
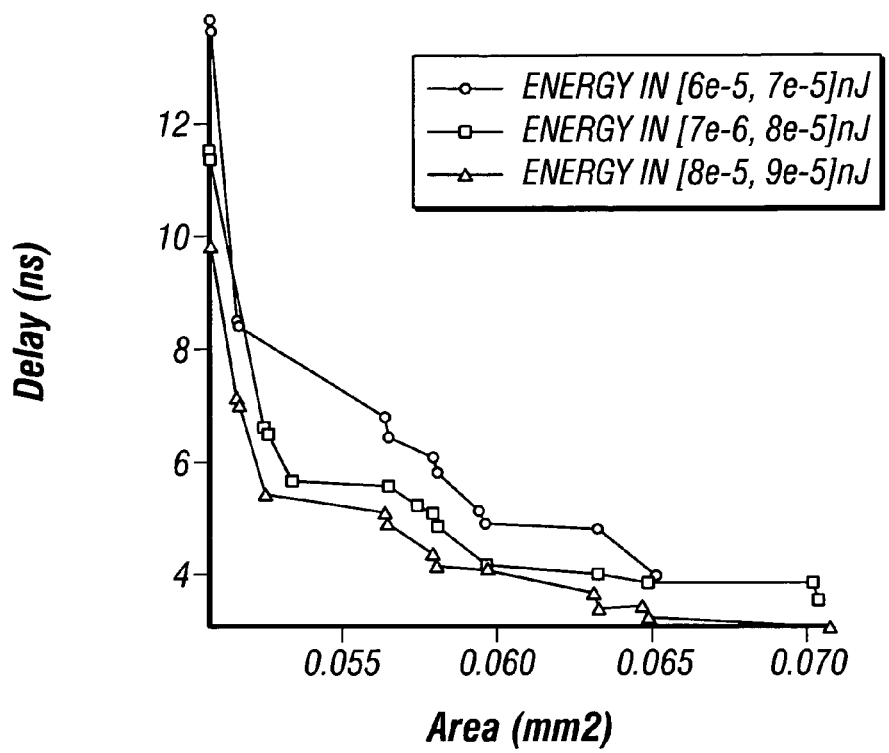
FIG. 25 illustrates a chart for explaining area-delay trade-off with energy consumption within limits.

Some figures that are even more interesting are the following. FIG. 25 shows several area-delay Pareto curves, where the energy consumption is bounded to certain limits. It becomes clear that if area is important for the design, then it can be traded-off for delay.

Figure 26:
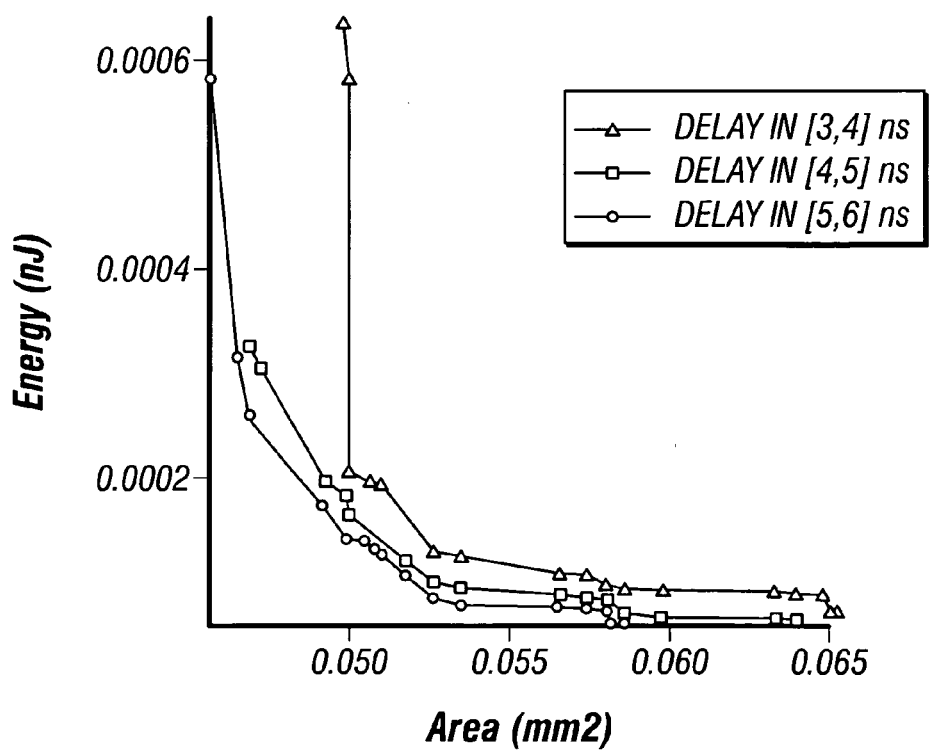
FIG. 26 illustrates a chart for explaining energy-area trade-off with delay within limits.

FIG. 26 is similar to the previous, but it is an energy-area Pareto curve with the delay within bounds. From this figure one can trade-off area for energy.

A conclusion derivable from the above is that in the approach according to one embodiment of the present invention, other aspects of the design can be taken into account, if necessary. For the context of embedded power-sensitive designs, typically large memories are present in the overall system that dominate the area. Also in the DAB core considered here, the largest memories dominate the area but they are less frequently accessed and play a smaller role in the global power consumption. So in the trade-off exploration area is not the most important metric. Another reason is that in deep-submicron nodes chips will become so dense that area will not be of paramount importance. In certain cases though, the trade-offs will become even more complex, since the energy-delay trade-off will then become an energy-delay-area trade-off which is also supported by methods according to one embodiment of the present invention.

5 Effects on the Memory Architecture 5.1 Memory Architecture

The impact of interconnect aspect ratio options inside each memory on distributed custom memory architectures has been explored.

The assumptions made about the memory organization are that memories have one read-write port and they can be accessed in parallel. This implies that each memory has its own bus connecting it to the datapath or to other memories. These assumptions, however, impose some constraints on the allocation and assignment of arrays in memories. Two arrays that have to be accessed in the same cycle cannot be stored in the same memory. To overcome these problems the Memory Allocation and Assignment tool [13] is used for the array to memory mapping.

The power consumption of a memory organization depends on two parameters. The energy consumption per access of each memory and the access frequency each memory has. In order to have minimum memory power consumption, both these parameters are minimized.

The energy consumption per access of a memory is directly linked with its size. Of course, many other factors have an influence. To minimize the energy, one has to keep the size as small as possible. On the other hand, the access frequency of each array is dictated by the application.

Figure 27:
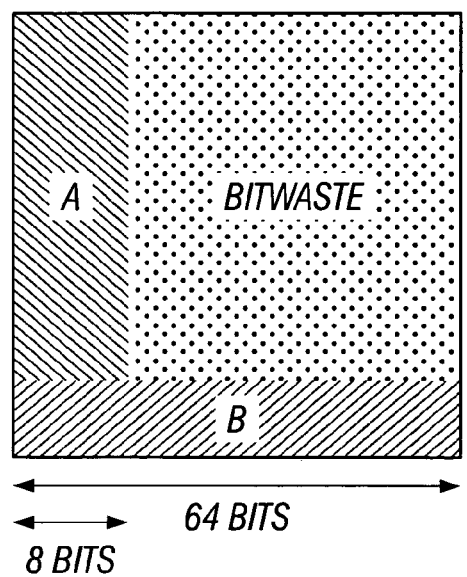
FIG. 27 illustrates a chart for explaining Bit-waste.

From these observations, it can be concluded that the power consumption of the memories is minimum when there are a lot of them and they are made as small as possible. Thus, the best strategy is to have each array stored in its own memory. For practical reasons such as testing though, usually that large amount of memories is not feasible. Moreover, the inter-memory interconnect becomes an important contributor too if we split up too far. The result is that some arrays have to be stored together. The problems that arise are twofold. First, the sizes of the memories increase and second, the access frequencies of the memories increase. The second is not such a problem in itself, since the total number of memory accesses cannot change. But, combined with the increased sizes, it results in the same number of accesses happening to larger, more power hungry memories. The two main phenomena that can cause major problems are bit-waste and arrays with very different access frequencies being stored together. Bit-waste occurs when two arrays with different bitwidth are stored in the same memory. The memory has to be wide enough to accommodate the wide array, but as a result the narrow array cannot fill the remaining width, see FIG. 27.

This is bad for two reasons. First, memory space is wasted and more memory is needed to store the same amount of data. Secondly, the memory size increases resulting in larger energy consumption per access. In both cases, power consumption is increased. When two arrays that have very different access frequencies are stored together then both terms that affect power are increased. If an application is designed to be power-conscious the arrays that are heavily accessed should be as small as possible. This way the memory power will not explode. If such an array is stored in the same memory with a large array, then the access frequency of the memory is large due to the first and the memory size is large due to the second array. This is the worst possible combination and can result in a very significant increase in power consumption. In the DTSE script this is largely solved in practice by applying a correct BG partitioning strategy but this requires additional source code transformations that currently have to be applied manually. For the DAB application, most of this effort has been performed so the impact of the problem is heavily reduced.

When the number of available memories is limited, it is a good idea to put arrays that are seldom accessed together and arrays that are heavily accessed alone or together with similar arrays if they are quite small.

In the following an application that was used as a driver and then the results of a number of experiments and the influence of individual memory tradeoff over the total memory organization will be described.

5.2 Driver Application

In the near future mobile radios with Digital Audio Broadcast reception will be produced. A DAB broadcaster is able to provide either six high quality radio programs with associated data, or for instance one MPEG 1 video signal. DAB provides any combination of services up to a total of about 1.8 Mb/s. It uses Orthogonal Frequency Division Multiplex (OFDM) modulation scheme which is resistant against multi path interference and frequency-selective fading. The OFDM scheme contains up to 1536 carriers for terrestrial broadcasting (Mode I) and is implemented in the FFT processor. The channel coding is based on a convolutional code with constraint length 7 and a maximum redundancy factor of 4 (lowered by puncturing).

A heavy data transfer and storage (DTS) optimized version of the DAB decoder [22] has been used for the experiments. The optimizations applied focus mainly on reducing the power consumption of the implementation of this decoder by removing redundant accesses in the global data-flow transformation step and by improving access regularity and locality in the global loop trafo step. In general parallelism in memory accesses has been carefully exploited too. The access times for the various arrays have been globally optimized for power consumption. One major optimization is that accesses to the two larger arrays of the application have been software pipelined, allowing these memories to have an access time four times larger than that of the smaller arrays. This will allows to measure the effect of banking, interconnect aspect ratio and Vdd scaling on an already heavily optimized design. Of course, the optimizations that were applied also resulted in making the real-time constraint for the access times of the memories easier to meet.

The DTS optimized version of the DAB decoder uses 22 arrays. Seven of them are stored in ROMs, while the other 15 have to be assigned to SRAMs. Although we will not mention these 7 arrays or the ROMs further in this chapter, it should be noted that all the calculations and the figures include them. The reason they are not mentioned is that their contribution in power consumption is negligible. The remaining 15 arrays are the ones that consume almost all the power. Their sizes vary a lot. Two arrays are very larger than the other, one is 128 kbit and the other is 512 kbit. The rest of the arrays do not exceed 80 kbit in total, one is 40 kbit, two are about 10 kbit and the rest are quite smaller. Another important metric of the arrays is their access frequencies. The two large arrays have obviously been optimized to have few accesses and as a result, for the 512 kbit array the access frequency is 0.3 Maccesses per sec, while for the 128 kbit it is 0.17 Maccesses per sec. The 40 kbit array is accessed 3 million times per sec and the 10 kbit ones about 1 million. It becomes clear that even though two arrays dominate total memory size, their power contribution will not dominate overall power consumption, because of their reduced access frequencies. In a balanced design (DTSE optimized), this should always be the case.

The real time constraint for memory access times that this implementation implies is 23.5 ns. This is an access time most of the memories can achieve without problems. Furthermore, the two large arrays have constraints that are even more relaxed.

5.3 Experiments

The experiments that were made aim at showing the impact of a range in interconnect aspect ratio, Vdd scaling and banking on the power consumption of the memory organization of a complete application.

Before any experiments are made a memory library is built that meets certain timing constraints. A memory library is a collection of cost constraint value pairs or combinations, e.g. energy-area value pairs of memories of various sizes that have an access time smaller than the constraint. In the first experiments use will be made of the actual real time constraint of the DAB decoder, which is 23.5 ns for each memory access. The two large arrays of the application are allowed to have 4 times as much access time due to software parallelism. Thus, and due to their size, they will be stored in two memories alone, otherwise this advantage cannot be exploited. If something else is stored with them then the memories would have to be able to achieve the 23.5 ns access time. This is also the reason why the minimum number of memories is large. At least three memories are needed so that no conflicts exist between accesses in the other arrays and two memories for the large arrays.

Figure 28:
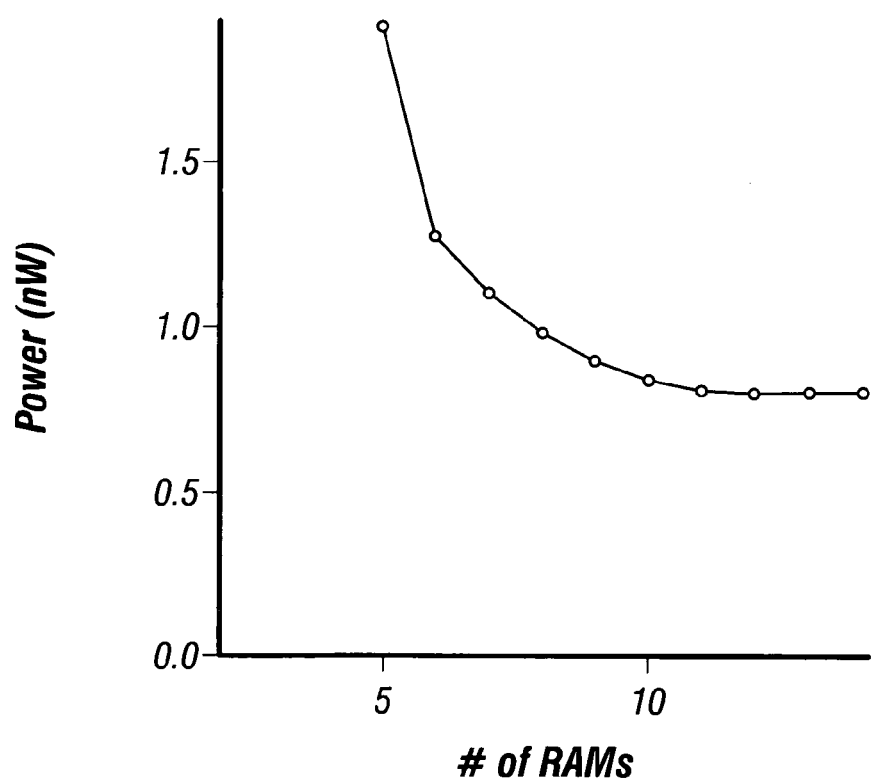
FIG. 28 illustrates a chart for explaining only banking explored, loose constraint.

In FIG. 28, it can be seen what happens when the only degree of freedom is banking. This figure shows how the power consumption evolves for a different number of memories in our distributed memory architecture. Given the fact that banking does not provide a significant energy-delay tradeoff, this is pretty much the situation as it is conventionally.

Each memory is banked as much as possible, to locally reduce energy consumption and delay, and uses the fast, but energy hungry aspect ratio. The reason this interconnect is used here is that general-purpose microprocessors, which drive technology, are not really power conscious designs.

FIG. 28 shows the trend expected for power. The more memories there are, the less power is consumed. Of course at some point the power consumption converges to the minimum possible value, which is encountered at the maximum number of memories or at the point where the inter-memory interconnect starts to become a significant contributor.

Figure 29:
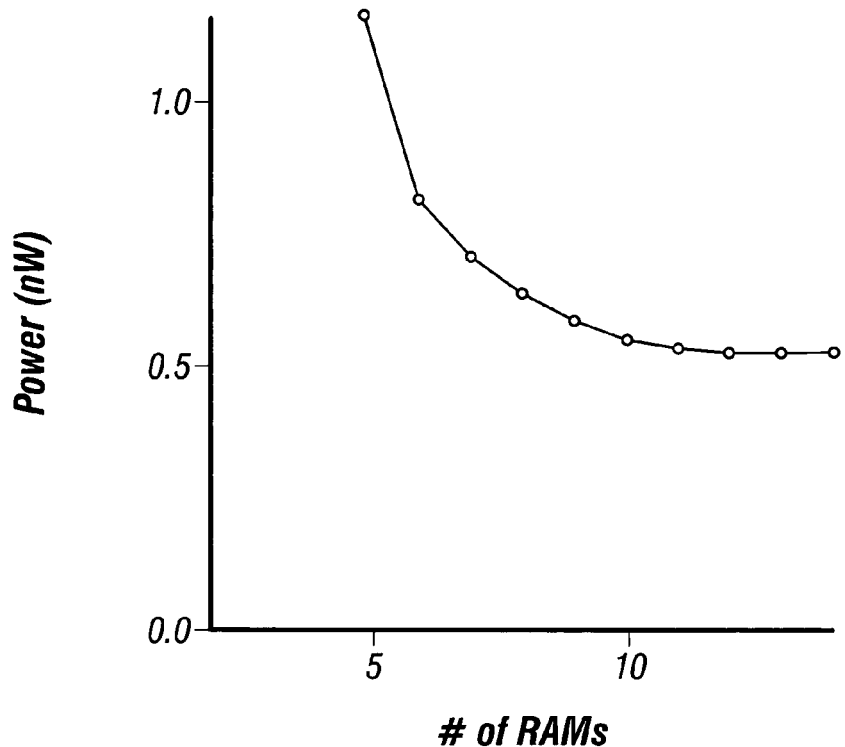
FIG. 29 illustrates a chart for explaining aspect ratio options and banking explored, loose constraint.

FIG. 29 shows the effect of using a more energy efficient aspect ratio. This figure was generated sing a memory library that explored banking and interconnect aspect ratios for the 23.5 ns real time constraint. Comparing FIGS. 28 and 29 one can see that a significant reduction of power consumption can be achieved by using slower, but more energy efficient interconnect. The reason one can do that is because careful application design and optimizations have led to a quite loose timing constraint that memories can very easily meet. As a result, memories can tradeoff remaining, unused, speed for improved energy consumption, minimizing overall power consumption of the application. The gain that can be achieved in this way is significant, since there is a reduction from 0.8 nW to 0.52 nW, about 30%, for the maximum number of memories.

Figure 30:
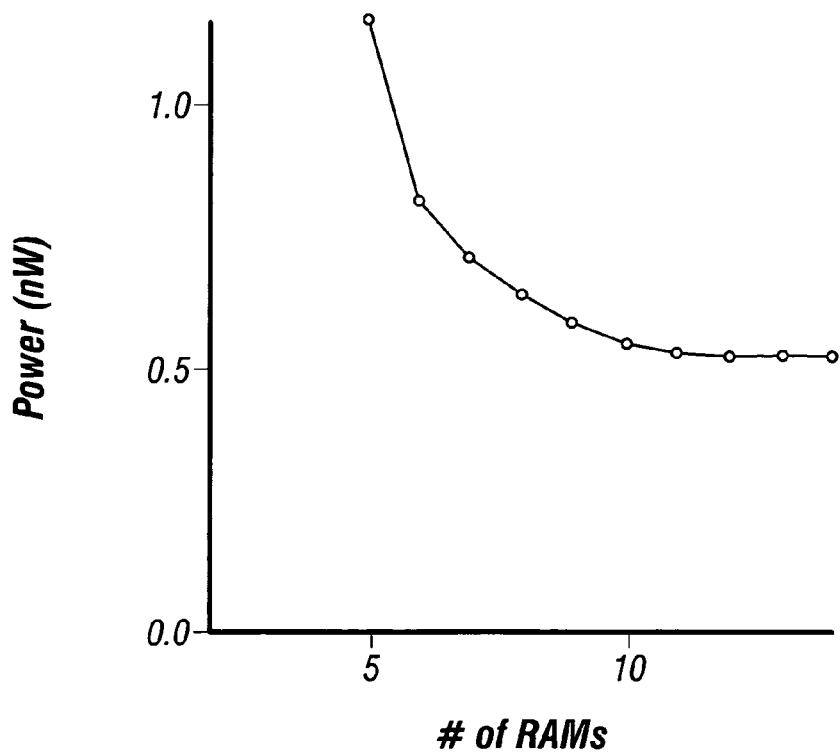
FIG. 30 illustrates a chart for explaining interconnect aspect ratio options, Vdd scaling and banking explored, loose constraint.

FIG. 30 shows the effects of using all possible explorations for individual memories, namely banking, aspect ratio options and Vdd scaling. It was expected that this curve would be the same as the one without the exploration of Vdd. Using Vdd values other than the absolute minimum, is only necessary in order to increase memory speed at the expense of energy consumption. Since the timing constraint is very loose, there is no reason to increase the supply voltage of the memories.

Although this DAB decoder is an actual design, its loose real-time constraints are not that typical. So in order to force the memories to become faster, exposing more tradeoffs, the same experiments have been using a timing constraint of 2 ns. This means that that each memory should have an access time of less than 2 ns, except from the two large memories that are allowed to respond at 8 ns.

Repeating the first experiment, where only banking is explored, the memories cannot meet the constraint anymore. This also means that using more energy efficient aspect ratios will not help, since the memory delay can only get worse. The only way to force the memories to meet the constraint is by using non-minimum supply voltage.

Figure 31:
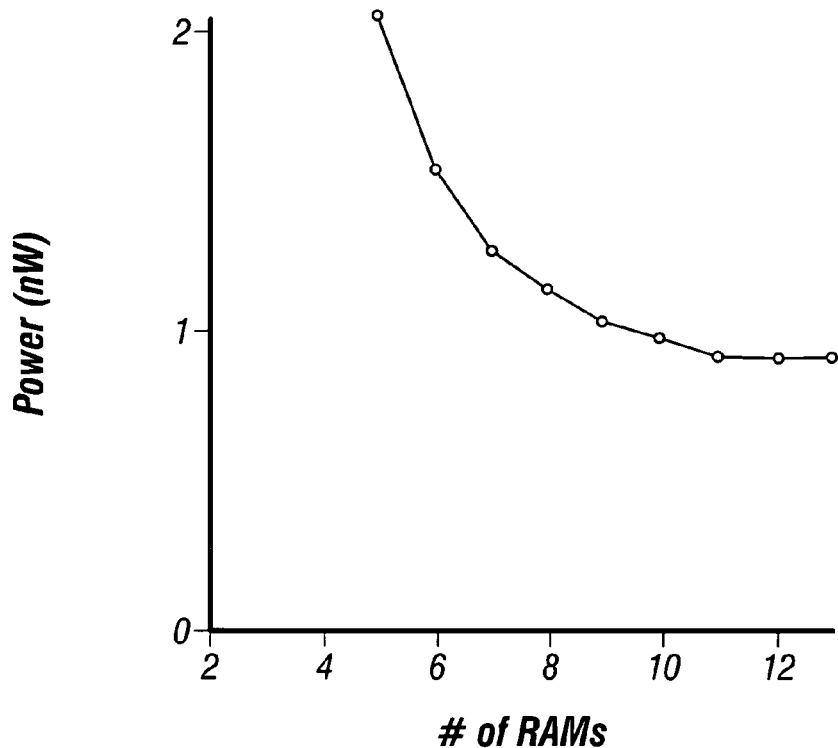
FIG. 31 illustrates a chart for explaining Vdd scaling and banking explored, tight constraint.

FIG. 31 show the resulting power consumption when Vdd scaling and banking are explored. The impact of increasing the Vdd is very clear, the minimum power consumption has risen to 0.91 nW. So, it is clear that one can tradeoff power for delay, if the design requirements are too difficult for the memories to achieve otherwise.

Figure 32:
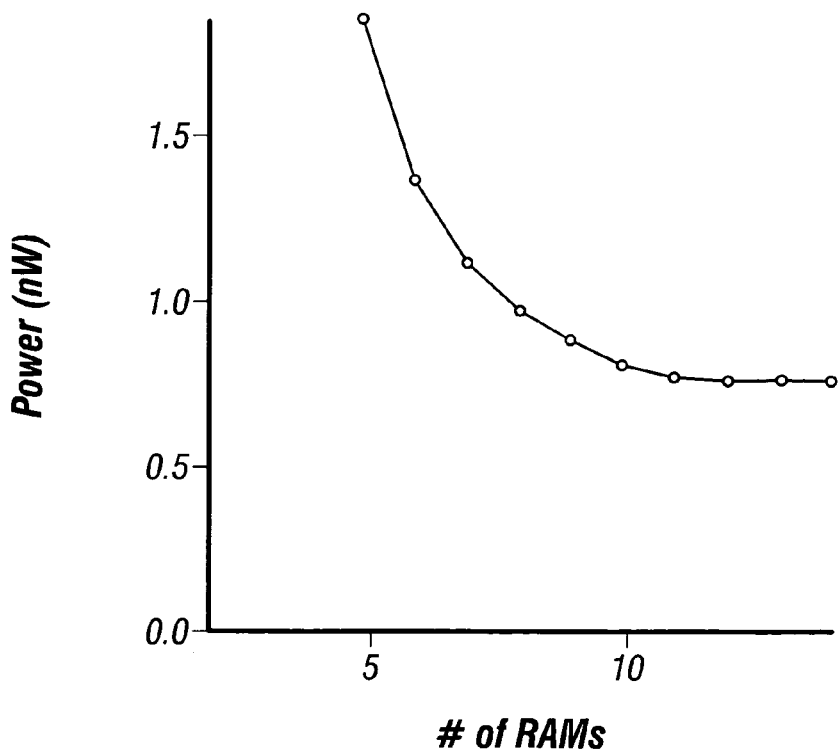
FIG. 32 illustrates a chart for explaining aspect ratio options, Vdd scaling and banking explored, tight constraint.

The last experiment which was made was to additionally explore interconnect aspect ratios, apart from Vdd and banking in the case of the tight constraint. The important result is that obviously by increasing the supply voltage, the maximum delay requirements were achieved, but not optimally. By also exploring interconnect, see FIG. 32, the power consumption dropped significantly, about 20%. The reason is that increasing the supply voltage results in a big step, energy consumption and delay of individual memories changes drastically. With the correct choice of interconnect parameters for each memory performance ca be fine tuned, so that the target delay is just met with the minimum energy consumption.

5.4 Conclusions

After all these experiments it becomes apparent that both Vdd scaling and the choice of different aspect ratios are valuable tools a system designer can use to match the application requirements with the minimum possible consumption of power. The scaling of the supply voltage is very important, because it is the only way to speed up the memories if the design constraints are very tight. On the other hand, a wide range of interconnect options enables the designer to customize the memories to such a degree, that the delay requirements are just met, but the power consumption is minimum.

6 Inter-memory Interconnect

For past and present technology nodes, technicians have not taken inter-memory interconnect into account when designing distributed memory organizations. This means that an architecture with the maximum number of memories is the most power efficient. However, this is not the case when inter-memory lines are taken into account. Although, the impact of the energy consumption of these lines is not easy to predict, going to the maximum number of memories will most probably not be power efficient, since the length of the buses becomes larger, depending of course on the floorplan and the routing. The memory organizations assumed are distributed but on-chip. So, all the interconnects refer to are on-chip connections.

Inter-memory interconnect consists of the buses that connect the memories to the functional units or to other memories. It is quite difficult to predict how much impact inter-memory interconnect is going to have on the power of a certain design, because it heavily depends on the floorplan and the placing and routing. The energy consumption of this interconnect depends on four things. Capacitance of the wires, voltage (supply and swing), activity and length.

The first two parameters have a direct link with process technology and circuit design and will not be explored. It will be assumed that inter-memory interconnect uses the lowest capacitance possible. Also the buses will be assigned capacitance and RC values according to their length. Shorter buses will be considered as intermediate interconnect, while longer will be treated as global. This decision is in line with the lengths predicted by the ITRS roadmap [8].

For the supply voltage of these buses the one predicted by the roadmap, namely 0.5V is used. The swing voltage is assumed to be 0.1V. In the memory model description it was concluded that a swing voltage that is 10% of the supply voltage is a realistic assumption, especially for on-chip connections. Having this in mind, 0.1V is a reasonable assumption for these buses.

As far as length is concerned, it depends on the floorplan and the place and route decisions. The result is that routing of these buses should start taking into account the impact their length has on system power consumption. Length of lines also affects system performance. Due to their length the delay these lines introduce can be significant and it should be added to the memory delay to give precise figures. Furthermore, the fact that first the address should be sent over a bus and then data should be received through the same or another bus, means that the bus delay is introduced twice in the delay of the memory system, making it even more important. In the experiments, inter-memory interconnect delay was not taken into account. For the DAB application, it is not critical since the real-time constraint is not tight.

Activity on the other hand is the parameter that system designers can use to optimize the power consumption on the buses of their designs. This is the only available parameter used for exploration.

6.1 Memory Architecture

The experiments done for the inter-memory interconnect were carried out on the same driver as the previous ones, the DAB decoder. The first step of these experiments is to define the memory architecture. It has been seen in the previous chapter that the DAB uses two large arrays that have looser time constraints and a number of smaller arrays. Thus, it makes sense to use a layered architecture, where the two large arrays will be stored in two memories in the second layer and the rest of the arrays will be stored in a number of first layer memories. The second layer memories are referred to as global and the first layer memories as local.

FIG. 4 shows what this architecture looks like. An architecture with eight local memories 120 and two global memories 100 is shown. The exploration degree of freedom in these experiments will be the number of local memories. This together with the allocation and assignment of arrays to memories dictates the bus activity. It does not make sense to play with the number of global memories, since the driver application pretty much defines the architecture. It is interesting, though, to note that if a one-layer approach was used buses of local memories could become much longer, increasing power consumption. This figure also shows a routing possibility for the inter-memory interconnect. The assumption we have made when choosing this routing was that the memories 100, 120 will not have to communicate directly with each other. The data will have to go from the memories 100, 120 to the functional unit 140 and then back to the memories 100, 120. This assumption holds for the DAB application, so the experiments were made on this architecture.

Note that each memory has its own dedicated bus. The alternative of bus sharing is not considered because it only benefits in terms of area. Sharing a common bus is not beneficial for power consumption, because it cannot reduce the number of lines that are active. Having dedicated buses means that one does not use more lines than necessary, even though the total number of wires is very increased. For delay the two options are similar, bus sharing may introduce some small delay due to switches that are required.

The lengths of the buses depend on the area that the memories occupy. This means that, because the buses have to pass across a number of memories, changing the area of the memories results in a change in the physical length of the lines.

Obviously, minimum length buses are desirable to have the most activity and the longer the buses are the less activity they should have. This is also in line with assigning the large and not frequently accessed arrays of the application on the second layer of the architecture.

Of course this is by far not an optimal routing strategy. The potential of having the interconnect on additional layers above the silicon means that these inter-memory interconnects can and should be routed above the memories and do not have to go around them. Also simple changes to the floorplan can have a positive impact of the length of these buses. Thus, the results that will be shown here for these lines can be further optimized by changing the place and route options.

Figure 33:
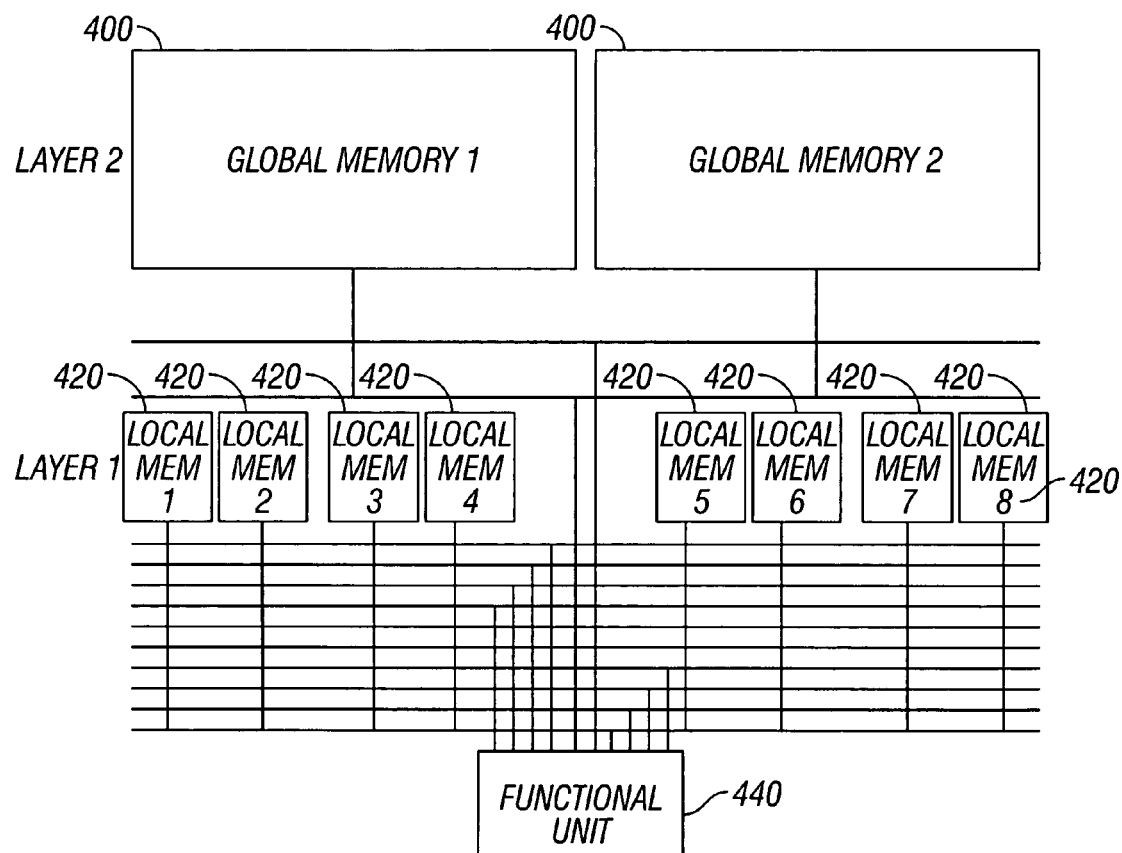
FIG. 33 illustrates a schematic diagram for explaining a more consuming option for a floor plan and routing architecture.

If the assumption about the communication between the memories did not hold then the resulting floorplan would have to look more like that in FIG. 33. Referring to FIG. 33, two global memories 400 and eight local memories 420 are connected to a functional unit 440. It is clear that connecting all the memories 400, 420 between them introduces a large overhead in the length of the buses. As a result, system performance and power consumption can be significantly degraded. But then, it is even more clear that more effort should be spent on the routing of the lines and the placing of the components, in order to minimize line length.

6.2 Explorations

Figure 34:
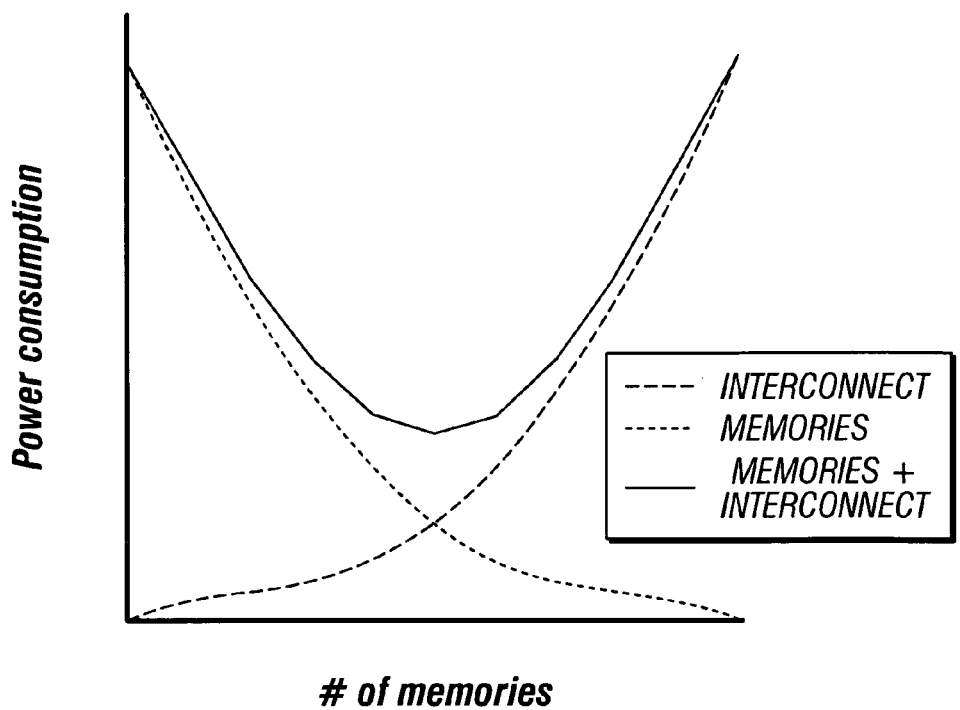
FIG. 34 illustrates a chart for explaining expected trend for memory and interconnect power consumption versus number of memories.

If inter-memory interconnect power consumption depended only on the length of the lines then one would expect the trend that is shown in FIG. 34. The more memories that are used increase the total length of buses. This is especially true if the routing of FIG. 33 was used, but in principle also holds for the routing of FIG. 4.

Fortunately activity on the buses is a very important parameter also and from a design perspective, global system wide explorations and optimizations can help reduce the power consumption of the inter-memory interconnect. Using such techniques along with good routing choices can help minimize this power.

A question that still remains is what is the actual impact of inter-memory interconnect and is it enough to change the optimal memory architecture as that was found above.

6.3 Results

Figure 35:
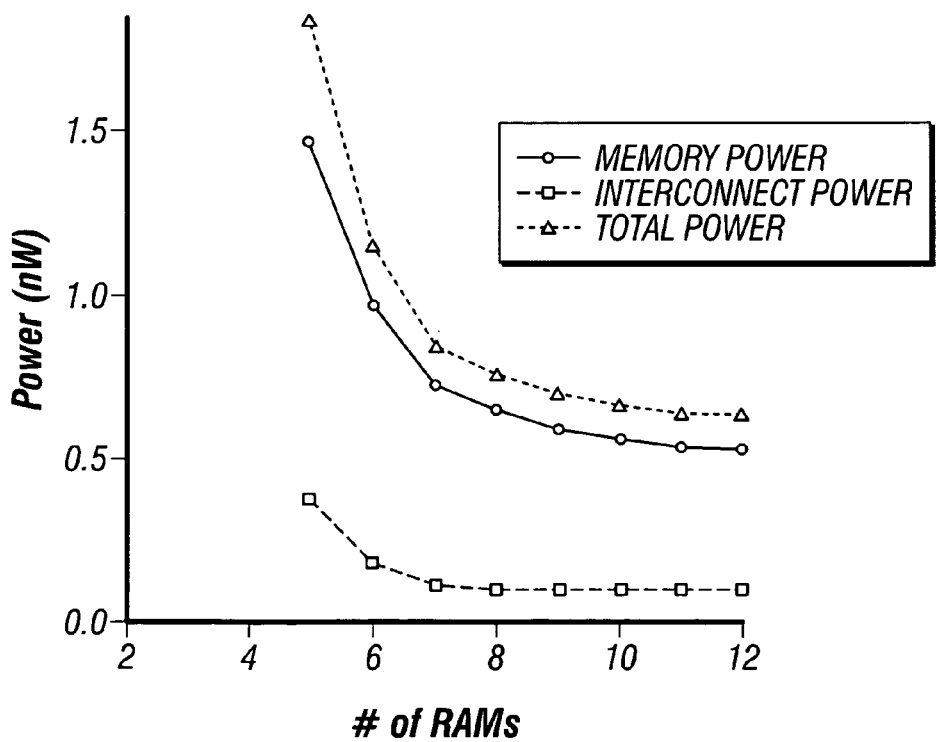
FIG. 35 illustrates a chart for explaining memory allocation and assignment with inter-memory interconnect for real-time constraint.

In FIG. 35 the power consumption of the memories and the inter-memory interconnect is shown. This experiment was done for the actual real-time constraint of the DAB application. The delay of the inter-memory interconnect, though, has not been taken into account for the appropriate selection of the speed of the memories. So 23.5 ns is the time in which the memory has to respond from the time it received the command, not the time between the functional unit issuing the command and getting the data. But, given the fact that the constraint is very loose this does not affect the outcome.

The power contribution of the interconnect is kept very low, at 11 memories it is 16% of the total consumption. This means that inter-memory interconnect does not seem to be the bottleneck.

Figure 36:
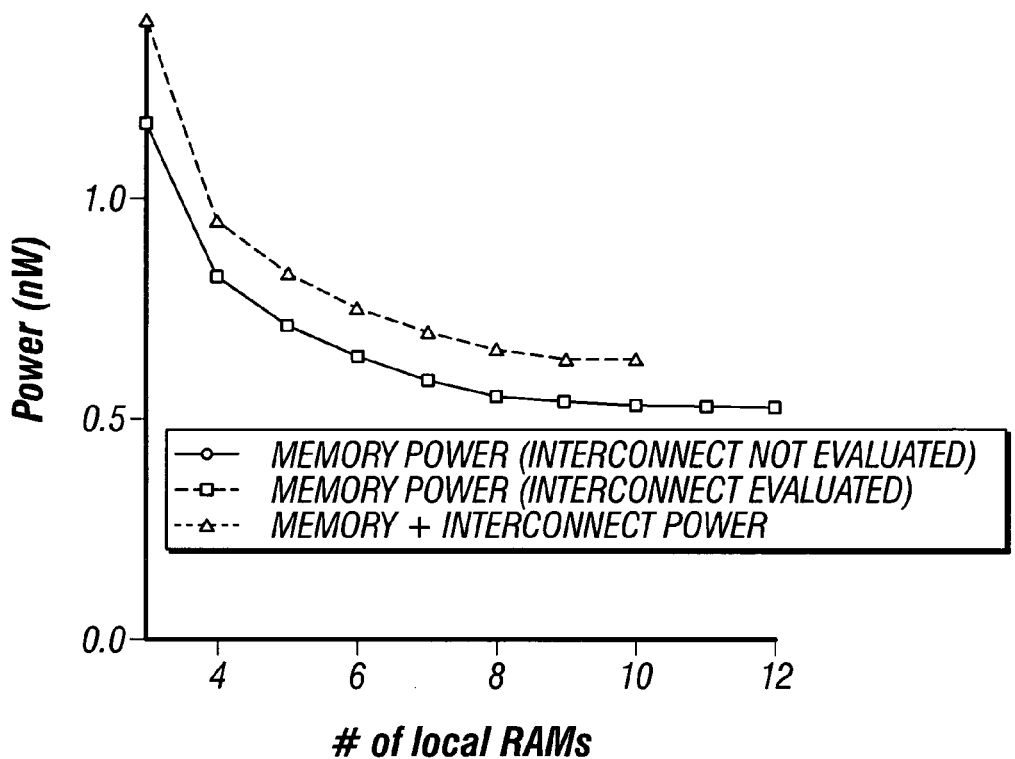
FIG. 36 illustrates a chart for explaining memory allocation and assignment with and without inter-memory interconnect for real-time constraint and the floor plan of FIG. 4.

If one goes a little further and compares the memory power consumption when inter-memory was not taken into account at all with the previous figure, one can see that the optimal memory does not change, see FIG. 36. In this figure the two lines for the memory power overlap, which means that the allocation and assignment of arrays to memories was almost identical in the two cases. So, the power contribution of the interconnect was not enough to force the tools to use fewer memories in order to reduce line length.

Figure 37:
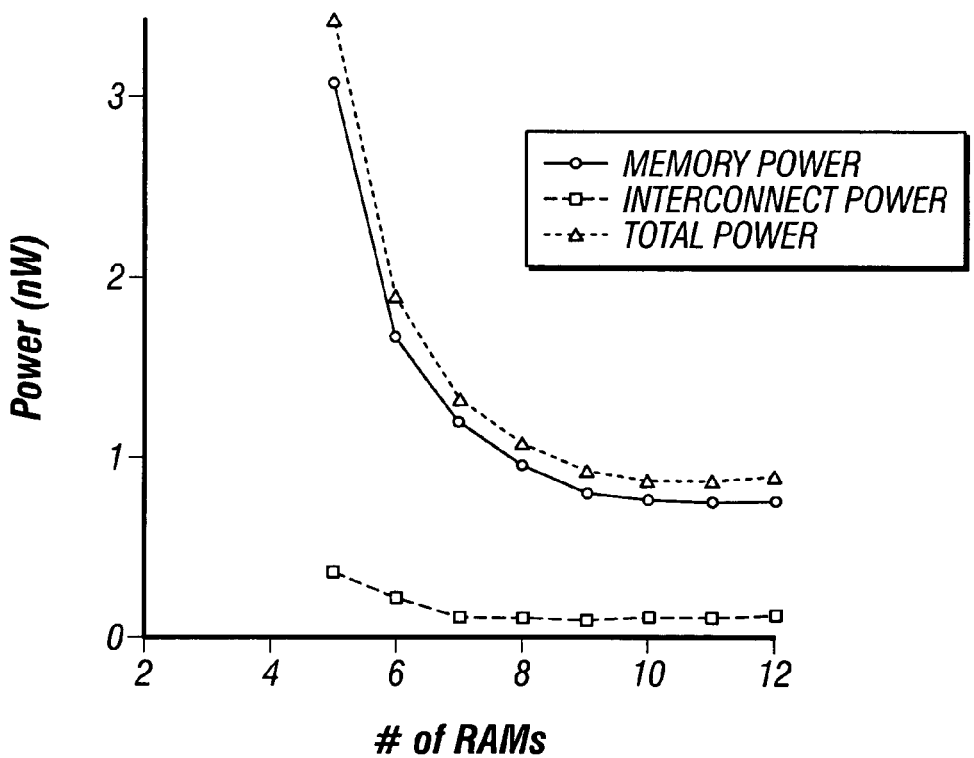
FIG. 37 illustrates a chart for explaining memory allocation and assignment with inter-memory interconnect for tighter time constraint—2 ns.

This experiment was extended, by measuring the contribution of the interconnect in the case where the timing constraint would be very tight. If the memories had to operate at 2 ns, then the results are shown in FIG. 37. It was expected that if the memories would have to increase their performance in order to meet the timing constraint, then the relative power consumption of the interconnect would become even lower. At 11 memories, which is optimal number of memories the power contribution of the buses was 12%.

To be fair, it should also be mentioned that the same effect, speeding up the system, can be partially achieved by using a faster option for the interconnect. Although, the main delay comes from the memories, speeding up the buses can give some performance improvement. But even in this case, the power consumption of the lines would only increase by about 50%. In Table 1 one can see that the RC delay of the wires can decrease by a factor of about 3, with an increase of only 50% in capacitance, thus power consumption. So the power contribution could go from 12% to about 20%. It is clear that further experiments are needed to explore these possibilities.

6.4 Platforms

For platforms, where the memory organization is fixed there is not much that can be done to optimize inter-memory interconnect. The only things that a designer can do is to match the bitwidths of the arrays as much as possible to the bitwidths of the memories and try to exploit any difference in the length of the inter-memory interconnects of the fixed platform. Matching the bitwidths is beneficial mainly for memory power consumption, but can impact also power consumption of the buses, if the bus lines that are not used are minimized. The length of the buses is a little harder to exploit. Ideally, if there are memories with shorter buses one can use them to store arrays with a lot of activity, large access frequency. Of course, that decision also depends on the bitwidth of the memory and the array. It, thus, pretty difficult to predict the behavior of the power consumption of the inter-memory interconnect, since it depends very much on the allocation and the assignment of arrays to memories. All this applies for on-chip memories.

7. Implementations at Run-time

The above embodiments have been described with reference to a component of an essentially digital system. However, one embodiment of the present invention also applies to any combinations of components of such as system, i.e. higher levels of organization. In particular, one embodiment of the present invention includes altering the run-time behavior of an essentially digital system by selecting one of one or more hardware components, each of which is able to carry bout the same tasks. In particular, one embodiment of the present invention includes an apparatus having a processing unit, for example a microprocessor or an FPGA, PAL, PLA or similar. The processing unit may be embedded, e.g. on a PCB or in an accelerator or in a specific module which is provided within a larger apparatus such as a personal computer, a mobile phone, a PDA. The processor co-operates with a first and a second essentially digital hardware device (EDHD). These two devices have prefer-ably been optimized by the methods explained above. Each of the first and second EDHDs are at least partly made by semiconductor processing and the manufacture of the first EDHD have at least one different semiconductor processing step compared with the manufacture of the second EDHD. The term "different semiconductor processing step" as used in this specification and attached claims includes a layout change (like another width of a line) or use of a different processing parameter. So, for instance, the semiconductor step which is different could be any of forming a conducting line width and/or length, using a material for a conductive or an insulating element, forming an aspect ratio of a conducting element, doping a semiconductor region, forming a transistor gate length, forming a transistor gate oxide thickness, forming spacing of conducting elements, or combinations thereof. These steps alter the properties of a sub-component which is comprised within the EDHD and alter the constraint-cost pair behavior of that device. The apparatus is for execution of a first and a second behavior, such as for example displaying a visible image or reproducing a audio tone, coding or encoding a digital bit stream or digital data, compressing or decompressing a digital bit stream or digital data, modulation or demodulation of a signal, for example in a telecommunications application. Thus, in this embodiment a redundancy is provided in the hardware of the apparatus, These two hardware devise are not exactly equivalent as they are each made with a different technology. Hence, the two devices differ from normal redundancy, for example, of memories which is provided for safety critical application. In particular the two devices, due to their different sub-component performances are able to perform differently with respect to different tasks. This may result in a trade-off. For example, device 1, when executing task 1, may have a lower cost function (e.g. uses less energy) but a higher constraint value (e.g. take more time to execute) than device 2. On the other hand, when device 1 executes task 2, the reverse is the case: it may have a higher cost function (e.g. uses more energy) but a lower constraint value (e.g. takes less time to execute) than device 2. If both task 1 and task 2 are to be performed by the apparatus, there may not be an optimum performance—instead it is necessary to select based on a trade-off of cost values while still trying to stay within constraint requirements.

The apparatus preferably has means for selecting one of the first and second EDHDs for execution of both the first and second behavior, e.g. at run-time. From the above description it can be said that each of the first and second EDHDs executes each of the first and second behaviors at a plurality of operating points belonging to a trade-off set, each operating point relating to a constraint-cost combination, wherein any first combination within the trade-off set is characterized in that all combinations within the trade-off set having a cost function with a lower cost value than the first combination have a higher value of the constraint than the first combination and wherein all combinations within the trade-off set having a value of the constraint lower than that of the first combination have a higher value of the cost function than that of the first combination. The trade-off is preferably Pareto optimized.

This selection in accordance with trade-offs provides a flexibility at run time to make the final performance a better fit to the complete apparatus. In the above example only two tasks have been considered but the present invention is not limited to evaluating two such tasks. Preferably, the operating system of the essentially digital device is adapted to include the selection means.

Figure 38:
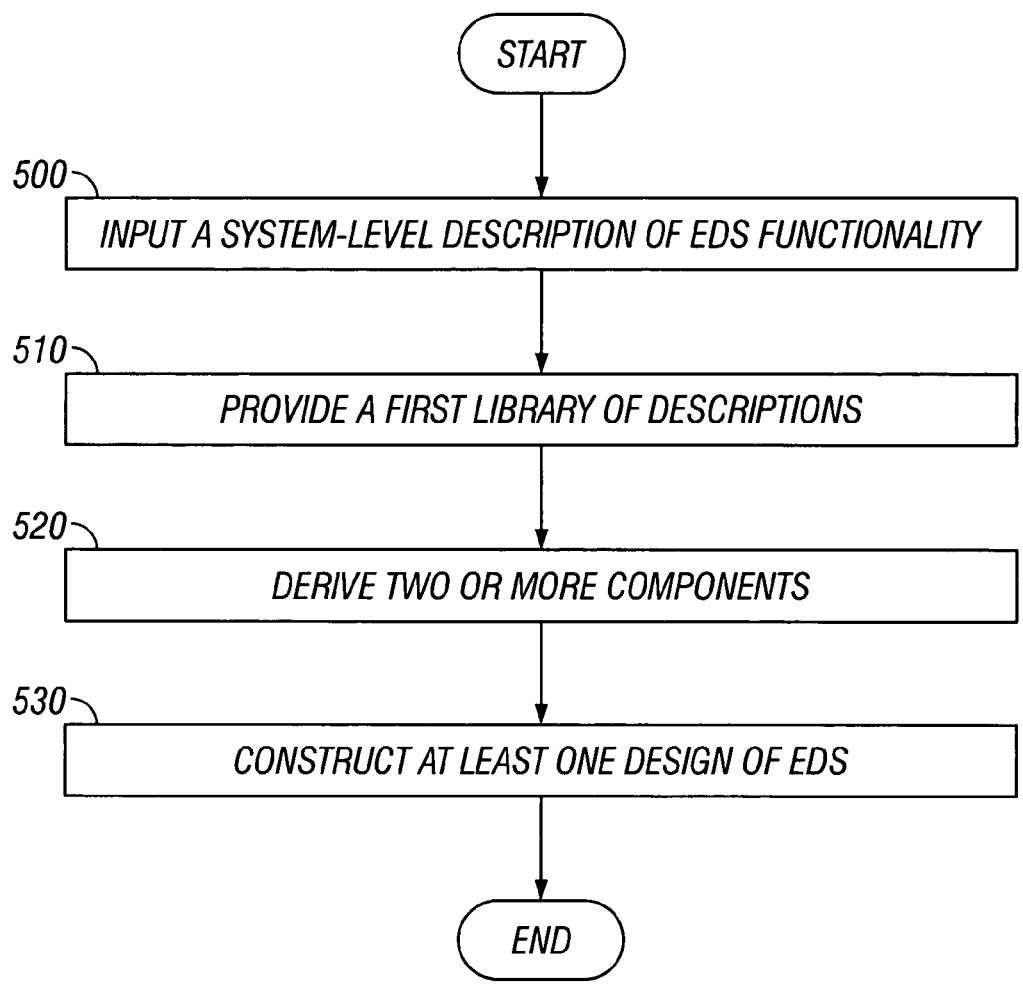
FIG. 38 is an exemplary flowchart illustrating a method of designing an EDS according to one embodiment of the invention.

FIG. 38 is an exemplary flowchart illustrating a method of designing an EDS according to one embodiment of the invention. Referring to FIG. 38, an inputting state 500, a providing state 510, a deriving state 520 and a constructing state 530 are shown. In one embodiment, the states 500–530 are performed in a processing unit of a computer system. In one embodiment of the invention, a procedure including the states 500–530 is implemented in a conventional programming language, such as C or C++ or another suitable programming language. In one embodiment of the invention, the program is stored on a computer accessible storage medium. The storage medium may comprise any of a variety of technologies for storing information. In one embodiment, the storage medium comprises a random access memory (RAM), hard disks, floppy disks, digital video devices, compact discs, video discs, and/or other optical storage mediums, etc. Depending on the embodiments, additional states may be added, others removed, or the order of the states changes.

Starting at the inputting state 500, the computer system or the processing unit, performing the above procedure, inputs a system-level description of a functionality of the EDS including design parameters of the EDS for executing at least one system task.

Next, at the providing state 510, the computer system provides a first library of descriptions of hardware components (510). In one embodiment, at least some of the hardware components are suitable for use in the EDS and each is suitable for executing a component task, and at least a first group and a second group of components are at least partly made by semiconductor processing. In one embodiment, the manufacture of the first component group includes at least one different semiconductor processing step compared with the manufacture of the second component group, wherein the first library is structured such that for each of the first and second groups of components, performance parameters are accessible, performance parameters are at least a cost function and a constraint related to executing the component task.

Continuing at the deriving state 520, the system derives from the first library two or more components from the first and/or second group belonging to a first trade-off set, each component belonging to the first trade-off set having a cost function-constraint combination. In one embodiment, any first combination within the first trade-off set is characterized in that all combinations within the first trade-off set, having a cost function with a lower cost value than the first combination, have a higher value of the constraint than the first combination and that all combinations within the first trade-off set, having a value of the constraint lower than that of the first combination, have a higher value of the cost function than that of the first combination.

At the constructing step 530, the system constructs at least one design of the EDS compatible with the high level description from one or more components of the trade-off set.

Figure 39:
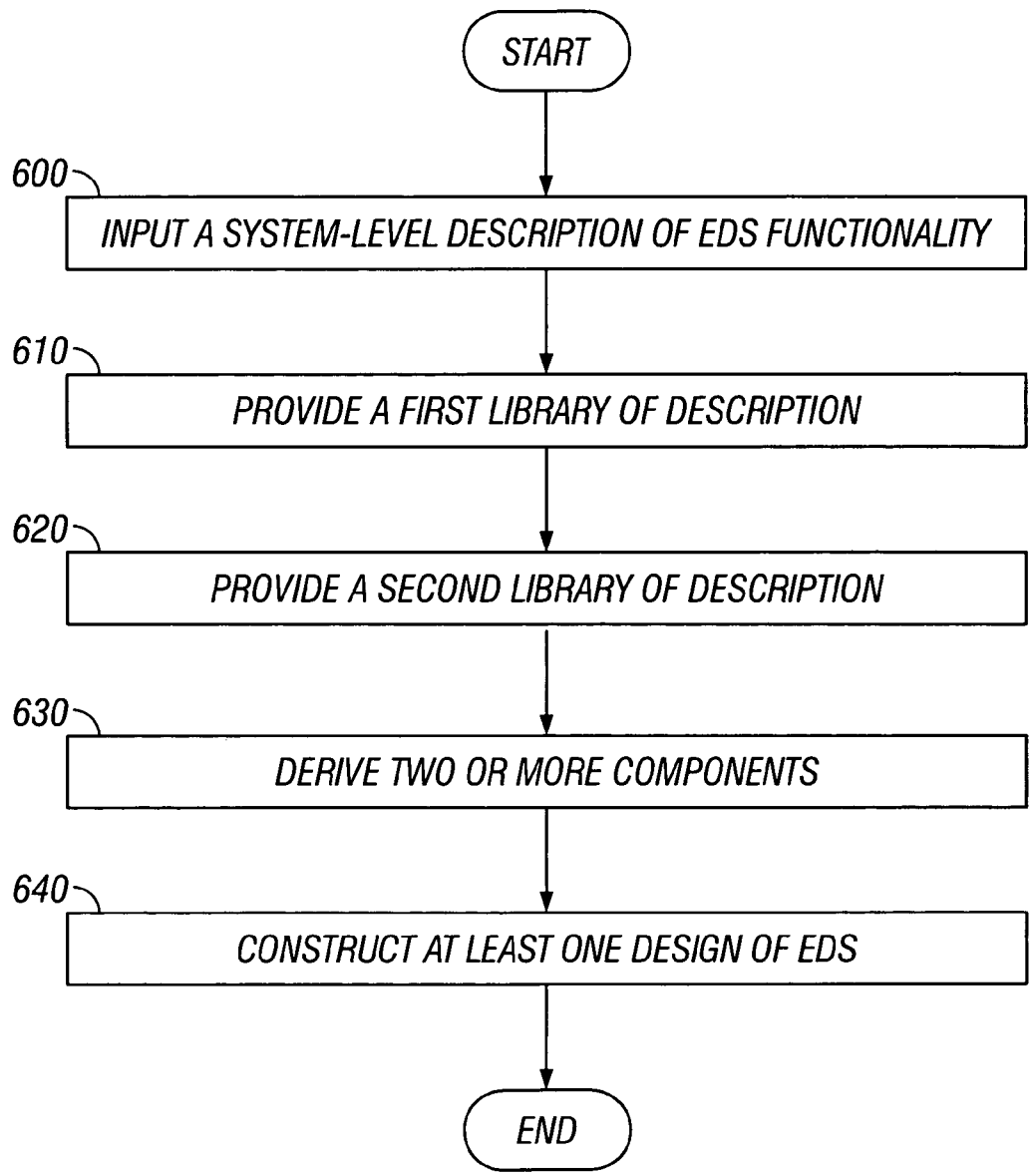
FIG. 39 is an exemplary flowchart illustrating a method of designing an EDS according to another embodiment of the invention.

FIG. 39 is an exemplary flowchart illustrating a method of designing an EDS according to another embodiment of the invention. Referring to FIG. 39, an inputting state 600, providing states 610–620, a deriving state 630 and a constructing state 640 are shown. In one embodiment, the states 600–640 are performed in a processing unit of a computer system. Depending on the embodiments, additional states may be added, others removed, or the order of the states changes.

Starting at the inputting state 600, the computer system or processing unit, inputs a system-level description of a functionality of the EDS including design parameters of the EDS for executing at least one system task.

Next, at the providing state 610, the processing unit provides a first library of descriptions of hardware components, at least some of the hardware components being suitable for use in the EDS and each being suitable for executing a component task. In one embodiment, at least a first group and a second group of components are at least partly made by a semiconductor processing. In one embodiment, the manufacture of the first component group includes at least one different semiconductor processing step compared with the manufacture of the second component group, wherein the first library is structured such that for each of the first and second groups of components, performance parameters are accessible, performance parameters being at least a first costs function and a second constraint when executing the component task.

Continuing at the providing state 620, the processing unit provides a second library of descriptions of first and second hardware sub-components, at least some of the hardware sub-components being suitable for use in the first and/or second hardware components and each sub-component having at least two performance parameters, wherein the performance parameters include at least a second cost function and at least a second constraint. In one embodiment, at least a third group and a fourth group of sub-components are at least partly made by a semiconductor processing. In one embodiment, the manufacture of the third sub-component group includes at least one different semiconductor processing step compared with the manufacture of the fourth sub-component group.

In one embodiment, the second library is structured such that for each of the third and fourth groups of sub-components the performance parameters are accessible. In another embodiment, the providing of the first library comprises deriving the first library from the second library by selecting two or more sub-components from the third and/or fourth group belonging to a first trade-off set for the design of the components of the first and second group, each sub-component of the trade-off set having a second cost-constraint combination.

Proceeding to the deriving state 630, the processing unit derives from the first library two or more components from the first and/or second group belonging to a second trade-off set, each component of the trade-off set having a first cost-constraint combination. At the constructing state 640, the processing unit constructs at least one design of the EDS compatible with the high level description from one or more components of the second trade-off set.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

[APPENDIX]

[1] B. Amrutur, M. Horowitz, "Speed and power scaling of SRAMs", IEEE J. of Solid-state Circ., Vol. SC-35, pp. 175–185, February 2000.

[2] E. Brockmeyer, A. Vandecappelle, F. Catthoor, "Systematic Cycle budget versus System Power Trade-off: a New Perspective on System Exploration of Real-time Data-dominated Applications", Proc. IEEE Intnl. Symp. on Low Power Design, Rapallo, Italy, pp. 137–142, August 2000.

[5] J. A. Davis, R. Venkatesan, A. Kaloyeros, M. Beylansky, S. J. Shouri, K. Banejee, K. C. Saraswat, A. Rahman, R. Reif, J. D. Meindl, "Interconnect limits on gigascale integration (GSI) in the 21st century", Proc. of the IEEE, No. 3, Vol. 89, pp. 305-, March 2001.

[6] R. Ro, K. W. Mai, M. A. Horowitz, "The future of wires", Proc. of the IEEE, No. 4, Vol. 89, pp. 490-, April 2001.

[7] K. Itoh, Y. Nakagome, S. Kimura, T. Watanabe, "Limitations and challenges of multi-gigabit DRAM chip design", IEEE J. of Solid-state Circ., Vol. SC-32, pp. 624–634, May 1997.

[8] International Technology Roadmap for Semiconductors 2001, http://public.itrs.net.

[9] D. Matzke, "Will physical scalability sabotage performance gains?", IEEE Computer Mag., pp. 37-, September 1997.

[10] A. Papanikolaou, M. Miranda, F. Catthoor, R. Corporaal, R. De Man, D. De Roest, M. Stucchi, K. Maex, "Interconnect Exploration for Future Wire dominated Technologies", invited paper at 4th ACM/IEEE Intnl. Wsh. on System Level Interconnect Prediction, San Diego Calif., April 2002.

[12] D. Sylvester, K. Keutzer, "Impact of small process geometries on microarchitectures in systems on a chip", Proc. of the IEEE, No. 4, Vol. 89, pp. 467-, April 2001.

[13] A. Vandecappelle, M. Miranda, E. Brockmeyer, F. Catthoor, D. Verkest, "Global Multimedia System Design Exploration using Accurate Memory Organization Feedback" Proc. 36th ACM/IEEE Design Automation Conf., New Orleans La., pp. 327–332, June 1999.

[14] S. J. E. Wilton, N. P. Jouppi, "CACTI: An enhanced cache access and cycle time model", IEEE J. of Solid State Circuits, Vol. 31, No. 5, pp. 677–688, May 1996.

[15] S. Wuytack, F. Catthoor, G. De long, R. De Man, "Minimizing the Required Memory Bandwidth in VLSI System Realizations", IEEE Trans. on VLSI Systems, Vol. 7, No. 4, pp. 433–441, December 1999.

[16] http://research.compaq.com/wrl/people/jouppi/CACTI.html

[17] Robert J. Evans, Paul D. Franzon *Energy Consumption Modeling and Optimization for SRAM's*, IEEE Journal of Solid-State Circuits, no. 5, vol. 30. pp. 571, May 1995.

[18] Teruo Seki, Eisaki Itoh, Chiaki Furukawa, Isamu Maeno, Tadashi Ozawa, Hiroyuki Sano and Noriyuki Suzuki, *A 6-ns 1-Mb CMOS SRAM with Latched Sense Amplifier*, IEEE Journal of Solid-State Circuits, no. 4, vol. 28, pp. 478, April 1993.

[19] Anantha P. Chandrakasan, Samuel Sheng and Robert W. Brodersen, *Low-Power CMOS Digital Design*, IEEE Journal of Solid-State Circuits, no. 4, vol. 27, pp. 473, April 1992.

[20] http://www.rambus.com

[21] http://www.research.compaq.com/wrl/projects/memorySystems/MemorySys.html

[22] D. Sylvester, K. Keutzer, Getting to the bottom of deepp submicron II: a global wiring paradigm, Proceedings of International Symposium on Physical Design 1999, pp. 193–200.

[24] J. Lachman, J. M. Hill, A 500 MHz 1.5 MB cache with on-chip CPU, Proceedings of the ISSC Conference 1999, p. 192.

[25] A. Chandrakasan, A. Burstein, R. W. Brodersen, A low power chipset for portable multimedia applications, Proceedings of the ISSC Conference 1999, p. 82.

The invention claimed is:

1. A method of designing an essentially digital system (EDS) which executes at least one system task, comprising:

inputting a system-level description of a functionality of the EDS including design parameters of the EDS for executing the system task;

providing a first library of descriptions of hardware components, at least some of the hardware components being suitable for use in the EDS and each being suitable for executing a component task, at least a first group and a second group of components being at least partly made by semiconductor processing, wherein the manufacture of the first component group has at least one different semiconductor processing step compared with the manufacture of the second component group, the first library being structured such that for each of the first and second groups of components, performance parameters are accessible, performance parameters being at least a cost function and a constraint related to executing the component task;

deriving from the first library two or more components from the first and/or second group belonging to a first trade-off set, each component belonging to the first trade-off set having a cost function-constraint combination, wherein any first combination within the first trade-off set is configured such that all combinations within the first trade-off set, having a cost function with a lower cost value than the first combination, have a higher value of the constraint than the first combination and such that all combinations within the first trade-off set, having a value of the constraint lower than that of the first combination, have a higher value of the cost function than that of the first combination; and constructing at least one design of the EDS compatible with the high level description from one or more components of the trade-off set.

2. The method according to claim 1, further comprising:

providing a second library of descriptions of first and second hardware sub-components, at least some of the hardware sub-components being suitable for use in the first and/or second hardware components and each sub-component having at least two performance parameters, the at least two performance parameters including a second constraint and a second cost function, at least a third group and a fourth group of sub-components being at least partly made by a semiconductor processing and the manufacture of the third sub-component group having at least one different semiconductor processing step compared with the manufacture of the fourth sub-component group, the second library being structured such that for each of the third and fourth groups of sub-components the performance parameters are accessible; and deriving the first library from the second library by selecting two or more sub-components from the third and/or fourth group belonging to a second trade-off set for designing the components of the first and second group, each sub-component belonging to the second trade-off set having a cost function-constraint combination, wherein any first combination within the second trade-off set is configured such that all combinations within the second trade-off set, having a cost function with a lower cost value than the first combination, have a higher value of the constraint than the first combination and that all combinations within the second trade-off set, having a value of the constraint lower than that of the first combination, have a higher energy consumption than that of the first combination.

3. The method according to claim 1, wherein the first trade-off set is Pareto optimized.

4. The method according to claim 2, wherein the second trade-off set is Pareto optimized.

5. The method according to claim 1, wherein the cost function includes at least one of the following: energy consumption, power and quality degradation.

6. The method according to claim 2, wherein the cost function includes at least one of the following: energy consumption, power and quality degradation.

7. The method according to claim 1, wherein the constraint includes at least one of the following: execution rate, bandwidth and latency.

8. The method according to claim 2, wherein the constraint includes at least one of the following: execution rate, bandwidth and latency.

9. The method according to claim 1, wherein the semiconductor processing step includes at least one of the following: forming a conducting line width and/or length, using a material for a conductive or an insulating element, forming an aspect ratio of a conducting element, forming spacing of conducting elements, doping a semiconductor region, forming a transistor gate length and forming a transistor gate oxide thickness.

10. The method according to claim 2 wherein the sub-component includes at least one of the following: a conducting line or element, a material for a conductive or an insulating element, an array of at least two conducting elements spaced apart, a doped semiconductor region, a transistor, a transistor gate, a transistor gate oxide, a resistor, a capacitor and an inductor.

11. The method according to claim 1, wherein the component includes at least one of the following: a storage device, a memory, an FPGA, a PLA, a PAL, a microprocessor, a co-processor, a digital signal processing (DSP) circuit, a pipeline, a hardware accelerator, a driver circuit, a modem and an I/O interface circuit.

12. The method according to claim 1, wherein the design parameters include at least energy consumption when executing the system task and a rate of execution of the system task.

13. A method of designing an essentially digital system (EDS) which executes at least one system task, comprising:
inputting a system-level description of a functionality of the EDS including design parameters of the EDS for executing the system task;
providing a first library of descriptions of hardware components, at least some of the hardware components being suitable for use in the EDS and each being suitable for executing a component task, at least a first group and a second group of components being at least partly made by semiconductor processing, wherein the manufacture of the first component group has at least one different semiconductor processing step compared with the manufacture of the second component group, the first library being structured such that for each of the first and second groups of components, performance parameters are accessible, performance parameters being at least a first costs function and a second constraint when executing the component task;
providing a second library of descriptions of first and second hardware sub-components, at least some of the hardware sub-components being suitable for use in the first and/or second hardware components and each sub-component having at least two performance parameters, the performance parameters including at least a second cost function and at least a second constraint, at least a third group and a fourth group of sub-components being at least partly made by a semiconductor processing and the manufacture of the third sub-component group having at least one different semiconductor processing step compared with the manufacture of the fourth sub-component group, the second library being structured such that for each of the third and fourth groups of sub-components the performance parameters are accessible;
wherein providing the first library comprises deriving the first library from the second library by selecting two or more sub-components from the third and/or fourth group belonging to a first trade-off set for the design of the components of the first and second group, each sub-component of the trade-off set having a second cost-constraint combination;
deriving from the first library two or more components from the first and/or second group belonging to a second trade-off set, each component of the trade-off set having a first cost-constraint combination, and
constructing at least one design of the EDS compatible with the high level description from one or more components of the second trade-off set.

14. The method according to claim 13, wherein at least one of the first and second trade-off sets is Pareto optimized.

15. The method according to claim 13, wherein the cost function includes at least one of the following: energy consumption, power and quality degradation.

16. The method according to claim 13, wherein the constraint includes at least one of the following: execution rate, bandwidth and latency.

17. The method according to claim 13, wherein the semiconductor processing step includes at least one of the following: forming a conducting line width and/or length, using a material for a conductive or an insulating element, forming an aspect ratio of a conducting element, forming spacing of conducting elements, doping a semiconductor region, forming a transistor gate length and forming a transistor gate oxide thickness.

18. The method according to claim 13, wherein the sub-component includes at least one of the following: a conducting line or element, a material for a conductive or an insulating element, an array of at least two conducting elements spaced apart, a doped semiconductor region, a transistor, a transistor gate, a transistor gate oxide, a resistor, a capacitor and an inductor.

19. The method according to claim 13, wherein the component includes at least one of the following: a storage device, a memory, an FPGA, a PLA, a PAL, a microprocessor, a co-processor, a digital signal processing (DSP) circuit, a pipeline, hardware accelerator, a driver circuit, a modem and an I/O interface circuit.

20. The method according to claim 13, wherein the design parameters are at least energy consumption when executing the system task and a rate of execution of the system task.

21. The method according to claim 13, wherein the system task is a data dominated task.

22. The method according to claim 13, wherein the system task includes at least one of the following: displaying a visible image or reproducing a audio tone, coding or encoding a digital bit stream or digital data, compressing or decompressing a digital bit stream or digital data, modulation and demodulation of a signal.

23. The method according to claim 13, wherein the constructing comprises constructing the design of the EDS compatible with the high level description having at least first and second components of the trade-off set, each being for execution of a task, and designing an operating system for the EDS such that the EDS is for execution of a first and a second behavior, and the operating system has means for selecting one of the first and second components for execution of both the first and second behavior, each of the first and second components being able to execute each of the first and second behaviors at a plurality of operating points belonging to a third trade-off set, each operating point relating to a constraint-cost combination.

24. An apparatus for designing an essentially digital system (EDS) which executes at least one system task, the apparatus comprising:
a processing unit co-operating with a first and a second essentially digital hardware device (EDHD), each of the first and second EDHDs being at least partly made by semiconductor processing, wherein the manufacture of the first EDHD has at least one different semiconductor processing procedure compared with the manufacture of the second EDHD; and
a selecting unit configured to select one of the first and second EDHDs for execution of first and second behaviors, each of the first and second EDHDs executing each of the first and second behaviors at a plurality of operating points belonging to a trade-off set, each operating point relating to a constraint-cost combination,
wherein any first combination within the trade-off set is configured such that all combinations within the trade-off set, having a cost function with a lower cost value than the first combination, have a higher value of the constraint than the first combination and such that all combinations within the trade-off set, having a value of the constraint lower than that of the first combination, have a higher value of the cost function than that of the first combination.

25. The apparatus of claim 24, wherein the selecting unit is implemented in an operating system of the apparatus.

26. The apparatus of claim 24, wherein the EDHD includes at least one of the following: a memory, a microprocessor, a co-processor, an FPGA, a PLA, a PAL, a digital signal processing (DSP) circuit, a pipeline, a hardware accelerator, a driver circuit, a modem and an I/O interface circuit.

27. The apparatus of claim 24, wherein the trade-off set is preferably Pareto optimized.

28. An essentially digital system (EDS) designed by a method, wherein the method comprises:
inputting a system-level description of a functionality of the EDS including design parameters of the EDS for executing at least one system task;
providing a first library of descriptions of hardware components, at least some of the hardware components being suitable for use in the EDS and each being suitable for executing a component task, at least a first group and a second group of components being at least partly made by semiconductor processing, wherein the manufacture of the first component group has at least one different semiconductor processing step compared with the manufacture of the second component group, the first library being structured such that for each of the first and second groups of components, performance parameters are accessible, performance parameters being at least a cost function and a constraint related to executing the component task;
deriving from the first library two or more components from the first and/or second group belonging to a first trade-off set, each component belonging to the first trade-off set having a cost function-constraint combination, wherein any first combination within the first trade-off set is configured such that all combinations within the first trade-off set, having a cost function with a lower cost value than the first combination, have a higher value of the constraint than the first combination and such that all combinations within the first trade-off set, having a value of the constraint lower than that of the first combination, have a higher value of the cost function than that of the first combination; and
constructing at least one design of the EDS compatible with the high level description from one or more components of the trade-off set.

29. A computer readable medium storing executable codes, wherein the codes are configured to design an essentially digital system (EDS) which executes at least one system task, wherein the medium comprises:
a code configured to input a system-level description of a functionality of the EDS including design parameters of the EDS for executing at least one system task;
a code configured to provide a first library of descriptions of hardware components, at least some of the hardware components being suitable for use in the EDS and each being suitable for executing a component task, at least a first group and a second group of components being at least partly made by semiconductor processing, wherein the manufacture of the first component group has at least one different semiconductor processing step compared with the manufacture of the second component group, the first library being structured such that for each of the first and second groups of components, performance parameters are accessible, performance parameters being at least a cost function and a constraint related to executing the component task;
a code configured to derive from the first library two or more components from the first and/or second group belonging to a first trade-off set, each component belonging to the first trade-off set having a cost function-constraint combination, wherein any first combination within the first trade-off set is configured such that all combinations within the first trade-off set, having a cost function with a lower cost value than the first combination, have a higher value of the constraint than the first combination and such that all combinations within the first trade-off set, having a value of the constraint lower than that of the first combination, have a higher value of the cost function than that of the first combination; and
a code configured to construct at least one design of the EDS compatible with the high level description from one or more components of the trade-off set.

* * * * *

UNITED STATES PATENT AND TRADEMARK OFFICE
CERTIFICATE OF CORRECTION

PATENT NO. : 7,124,377 B2
APPLICATION NO. : 10/817310
DATED : October 17, 2006
INVENTOR(S) : Catthoor et al.

It is certified that error appears in the above-identified patent and that said Letters Patent is hereby corrected as shown below:

| Column | Line | |
|---|---|---|
| First Page Col. 2 (Other Publications) | 10 | After "Proc." delete "Of" and insert -- of--, therefor. |
| Page 2 Col. 1 (Other Publications) | 29 | Delete "Application"," and insert -- Applications", --, therefor. |
| Page 2 Col. 2 (Other Publications) | 21 | Delete "Exhibiton" and insert -- Exhibition --, therefor. |
| Sheet 1 of 23 (Fig. 2) | (Y axis) | Delete "(NJ)" and insert -- (nJ) --, therefor. |
| 7 | 40 | Delete "V dd" and insert -- Vdd --, therefor: |
| 14 | 67 | Delete "multiplexor" and insert -- multiplexer --, therefor. |
| 15 | 6 (Approx.) | Delete "TIme" and insert -- Time --, therefor. |
| 17 | 13 (Approx.) | Delete "usuable" and insert -- useable --, therefor. |
| 17 | 19 (Approx.) | Delete "cruve," and insert -- curve, --, therefor. |
| 17 | 46 (Approx.) | Delete "werte" and insert -- were --, therefor. |
| 17 | 61 | Delete "veing" and insert -- being --, therefor. |
| 18 | 2 | Delete "Cacti" and insert -- CACTI --, therefor. |
| 18 | 5 | Delete "ommited" and insert -- omitted --, therefor. |
| 24 | 38 | Delete "pJ" and insert -- nJ --, therefor. |

UNITED STATES PATENT AND TRADEMARK OFFICE
CERTIFICATE OF CORRECTION

PATENT NO. : 7,124,377 B2
APPLICATION NO. : 10/817310
DATED : October 17, 2006
INVENTOR(S) : Catthoor et al.

It is certified that error appears in the above-identified patent and that said Letters Patent is hereby corrected as shown below:

| Column | Line | |
|---|---|---|
| 29 | 3 | Delete "cost constraint" and insert -- cost-constraint --, therefor. |
| 30 | 23 | Delete "ca" and insert -- can --, therefor. |
| 37 | 6 | Delete "Banejee," and insert -- Banerjee, --, therefor. |
| 37 | 61 | Delete "deepp" and insert -- deep --, therefor. |

Signed and Sealed this

Seventeenth Day of April, 2007

JON W. DUDAS
*Director of the United States Patent and Trademark Office*